US006216117B1

(12) United States Patent
Hall

(10) Patent No.: US 6,216,117 B1
(45) Date of Patent: Apr. 10, 2001

(54) AUTOMATED NETWORK SIZING AND PRICING SYSTEM FOR SATELLITE NETWORK

(75) Inventor: Eric P. Hall, Allen, TX (US)

(73) Assignee: Electronic Data Systems Corp., Plano, TX (US)

( * ) Notice: Subject to any disclaimer, the term of this patent is extended or adjusted under 35 U.S.C. 154(b) by 0 days.

(21) Appl. No.: 09/157,640

(22) Filed: Sep. 21, 1998

(51) Int. Cl.[7] ...................................................... G06F 17/60
(52) U.S. Cl. .............................................. 705/400; 705/30
(58) Field of Search .................................... 705/1, 30, 34, 705/400; 707/503, 504, 509

(56) References Cited

U.S. PATENT DOCUMENTS 5,361,393 * 11/1994 Rossillo .................................. 713/1
5,572,644 * 11/1996 Liaw et al. .......................... 707/531
5,890,174 * 3/1999 Khanna et al. ...................... 707/504
5,970,476 * 10/1999 Fahey ..................................... 705/28
6,055,550 * 4/2000 Wallack ............................... 707/509

FOREIGN PATENT DOCUMENTS 10-320493 * 12/1998 (JP) .

OTHER PUBLICATIONS

Parkinston: "Build Your Own Economical Treasury System"; Corporate Cashflow, Sep. 1992, v13, n10, pp. 47–47.*

* cited by examiner

*Primary Examiner*—Edward Cosimano
(74) *Attorney, Agent, or Firm*—Baker Botts L.L.P.

(57) ABSTRACT

An automated satellite network sizing and pricing workbook (15) implemented on a computer system (10) that is programmed to execute electronic spreadsheet software. The workbook (15) is comprised of a number of worksheets (15A–15J). Some of the worksheets receive data, sometimes manually from a network provider and sometimes automatically from other worksheets, and perform "hidden" calculations to provide various data used for sizing and pricing the network. Other worksheets are for reference or for generating reports of calculated values. The worksheets interact with each other, and the network provider uses them interactively and iteratively to design a network that is feasible in terms of both capacity and cost.

17 Claims, 2 Drawing Sheets

AUTOMATED NETWORK SIZING AND PRICING SYSTEM FOR SATELLITE NETWORK

TECHNICAL FIELD OF THE INVENTION

This invention relates to computer software, and more particularly to an automated system for producing sizing and pricing data for a satellite network.

BACKGROUND OF THE INVENTION

Over the last two decades, satellite communications has captured the interest of diverse commercial users. The interconnections provided by satellite networks permit an economical and reliable transmission of voice, television, and data.

In one sense, a satellite system is a microwave radio system with a single repeater—the transponder in outer space. In another sense, satellites have a broadcast capability that is not easily duplicated with conventional land-line techniques. Broadcasting means that transmission from an earth station to a satellite can be relayed back to earth, addressed so that many earth stations can receive the transmitted message at the same time. This capability has made satellite television a recent success.

Due to technological advances in developing both launch vehicles and the satellites themselves, it has become possible to place into orbit larger satellites with expanded capacities for transmission to and from earth stations. In addition, the size and cost of earth stations have decreased to a point where user-owned earth stations are now a practical consideration for a business enterprise.

Satellite communications systems have distinctively different cost characteristics when compared to terrestrial communications systems. For example, the distance of transmission is not as large a factor as in communications systems that use transmission lines. Further complications in costing satellite communication are associated with shared versus private networks. With a shared network, the satellite customer relies on "hub" earth stations (receiving and transmitting antennas and related equipment) that are shared with other users of the same satellite. The links to the customer's premises are accomplished with telephone company interconnections. With a private network, the earth station is installed at the customer's site. This customer-owned earth station is connected by cable to the customer's on-premise communications network and further connections may be made to off-premise.

Satellite network providers typically lease bandwidth from a satellite operator, and then provide their customers with the equipment and services for the customer's network. These network providers base their fees on a multitude of factors. Just a few of the pricing considerations are: whether the hub earth station is shared or private, traffic or baseband equipment requirements, the bandwidth and power consumed on the satellite, antenna characteristics such as model and size and related equipment, and post-installation service. Added to this complicated set of pricing factors, is the fact that each customer's needs are unique. The task of designing and pricing a network system is a difficult one.

SUMMARY OF THE INVENTION

One aspect of the invention is an automated method of pricing a satellite network, using a computer programmed with electronic spreadsheet software. The method makes use of an "electronic workbook", comprised of a number of interrelated spreadsheets. A traffic sizing spreadsheet receives sizing input data, which represents the quantity of communications traffic on the network, and calculates sizing output data for the network. A unit costing spreadsheet receives cost input data, which represents the cost for each of a number of units of equipment and service associated with the network, and calculates unit cost values. An input spreadsheet receives various network input data, such as, equipment unit data, hub service data, hub equipment data, space segment data, where the hub equipment data and said space segment data are obtained from the sizing output data. A technical infrastructure spreadsheet calculates financial data from data retrieved from the input spreadsheet. Likewise, a quote document spreadsheet calculates customer quote data from data retrieved from the input spreadsheet. Thus, the spreadsheets share both input data and calculated data to provide a variety of network sizing and pricing data.

An advantage of the invention is that it provides a "workbook" of interconnected spreadsheets for use by a network provider. The workbook simplifies and standardizes the design, costing, and quote process for satellite networks. Specialized models, tables, and algorithms are integrated into the workbook. For shared hub networks, a consistent and fair treatment of each customer is guaranteed by the use of an embedded "shared usage" algorithm.

For a particular customer, the workbook can be run with different parameters, so that the customer can intelligently compare networks on the basis of their cost. For example, the workbook could be run once for a shared hub and once for a private hub.

The workbook provides various documents that suited for various aspects of the design and pricing process. For example, the technical infrastructure spreadsheet is designed to meet requirements for the network provider's internal financial records, whereas the quote document spreadsheet is designed for the customer's use. An optional competitive analysis spreadsheet provides a convenient means for providing cost comparisons with competing network providers. In the case of the latter spreadsheet, it solves the problem of unbundling network components, an especially difficult task in the case of satellite systems.

In summary, the invention provides an automated process for pricing any satellite network design. The pricing information can be provided to a potential customer, who may then make an informed decision about whether to obtain the satellite network and, if so, what type of equipment and service should be included.

DETAILED DESCRIPTION OF THE INVENTION

Figure 1:
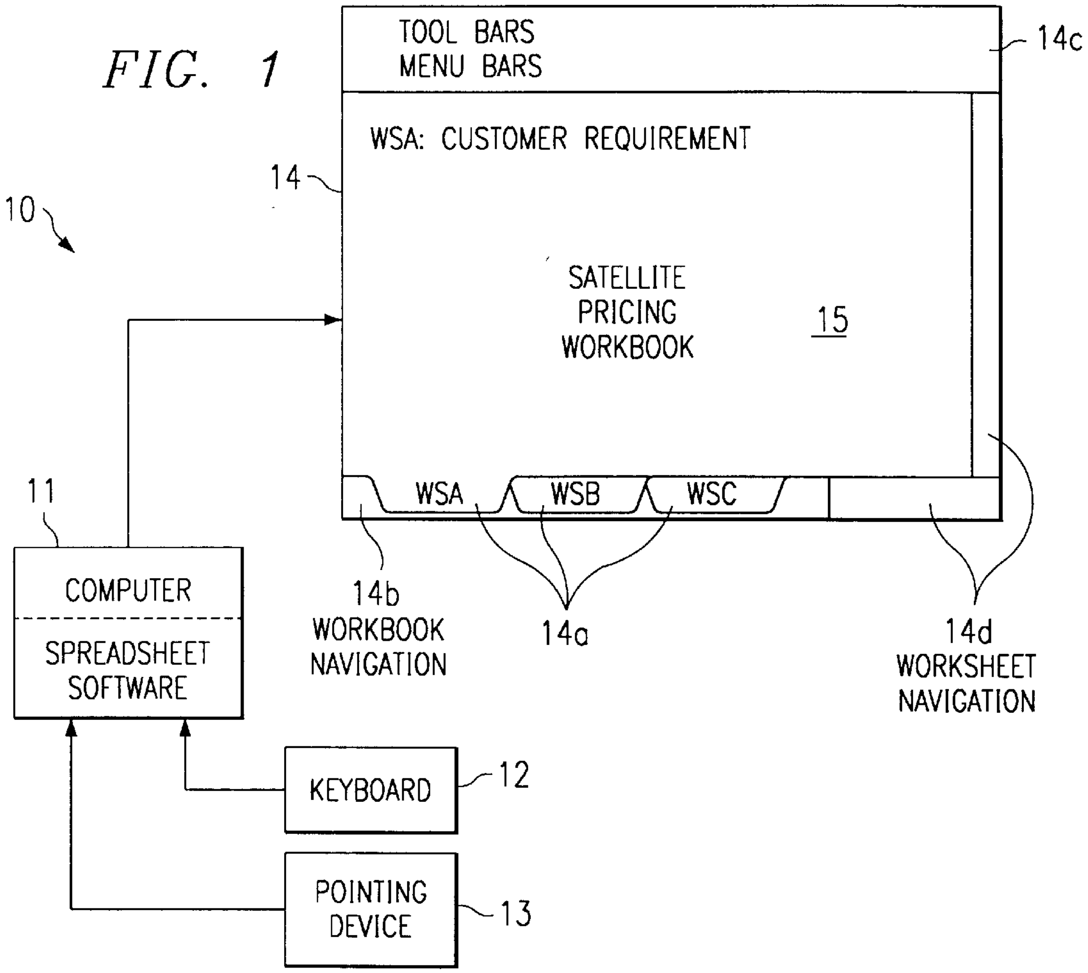
FIG. 1 illustrates an example of a computer system programmed to provide an automated satellite network sizing and pricing workbook in accordance with the invention.

FIG. 1 illustrates a satellite network pricing system 10 in accordance with the invention. The basic components of system 10 are a computer 11, a keyboard 12, pointing device 13, and display 14. Although not shown in FIG. 1, a printer may also be used to provide the same output as display 14 but in hard copy form.

As explained in further detail herein, computer 11 is programmed to receive data from a user, process the data, and display various reports, with the data being related to sizing and pricing a satellite network system. The typical user of system 10 is an enterprise in the business of setting up private satellite networks, herein referred to as a "network providers". The customers of this network provider are typically private enterprises with multiple locations, who desire enterprise-wide communications via satellite. In the example of this description, this type of network is referred to as a VSAT (very small aperture terminals) satellite network, but the invention is not limited to any one type of terminal or other equipments.

Typically, the satellite is owned by an enterprise that leases satellite services to various customers according to their bandwidth requirements, this sort of enterprise being referred to herein as the "satellite service provider". The satellite services may be for a variety of types of networks, including broadcast television and other types of communication, as well as for the VSAT satellite networks that are the subject of system 10.

Thus, for purposes of the invention, the satellite network providers are in the business of setting up satellite networks for individual customers. Hub earth station satellite antennas, which may be shared or private, are linked to land line networks of terminals and workstations. Typically, the customer has a central processing center, that will communicate via a shared or private "hub" earth station. The satellite network provider provides the equipment, the leased bandwidth, and other services. The equipment includes the VSATs (satellite dish antennas), which are available in a variety of models, sizes, and related hardware and software options.

The nature of satellite systems is such that pricing their purchase or lease, installation, and maintenance is complicated. Both the equipment, which may be purchased or leased, and the related services are often highly customized for each customer. For example, a large retail chain may wish to link all its stores in North America by means of satellite communications. The equipment and bandwidth required are two important considerations, but there are many more factors to be considered in determining how much an appropriate system will cost.

Computer 11 may be any type of commercially available computer. Computer 11 is assumed to have conventional computer components such as a processor, mass storage memory, active memory, and appropriate input/output interfaces.

In the example of this description, computer 11 is a "personal" computer, which stores and executes a "windows" type operating system, such as that manufactured by Microsoft Corporation. Computer 10 stores and executes a type of software known as an "electronic spreadsheet". In the example of this description, this software is the EXCEL® spreadsheet software manufactured by Microsoft Corporation. Like all electronic spreadsheet software, the EXCEL® software permits the user to make better use of data by organizing, calculating, and analyzing it. Formulas for handling data may be "hidden" behind a grid of data values. Values are calculated automatically using these hidden formulas, which reference data values by using grid locators. However, the concepts described herein could be applied to computer 11 running other operating systems and comparable electronic spreadsheet software.

An additional feature of computer 11 is that its electronic spreadsheet process is capable of providing multiple spreadsheets, whose data may shared among spreadsheets. A collection of such spreadsheets is referred to herein as a "workbook", and the terms "spreadsheet" and "worksheet" are used synonymously herein.

In the example of FIG. 1, display 14 is illustrated as being open to a first worksheet of a Satellite Pricing Workbook 15. This first worksheet is a Customer Requirements Worksheet, which is explained further in connection with FIG. 2. Workbook 15 is comprised of a number of worksheets 15A–15J, each especially designed for a particular aspect of satellite pricing. Each worksheet 15A–15J has been created from a blank grid of rows and columns provided by the spreadsheet software. Each location in the grid is a cell, identified by its row and column.

Each worksheet 15A–15J is accessed by means of a tab 14*a*. In the display of FIG. 1, only the tabs 14*a* for three worksheets, 15A–15C, are shown. The additional worksheets 15D–15J are "hidden", but are accessed by means of workbook navigation buttons 14*b*.

Toolbars 14*c* provide access to various tasks performed by the spreadsheet software. Navigation bars and buttons 14*d* provide access to any selected cell in the spreadsheet grid.

Figure 1A:
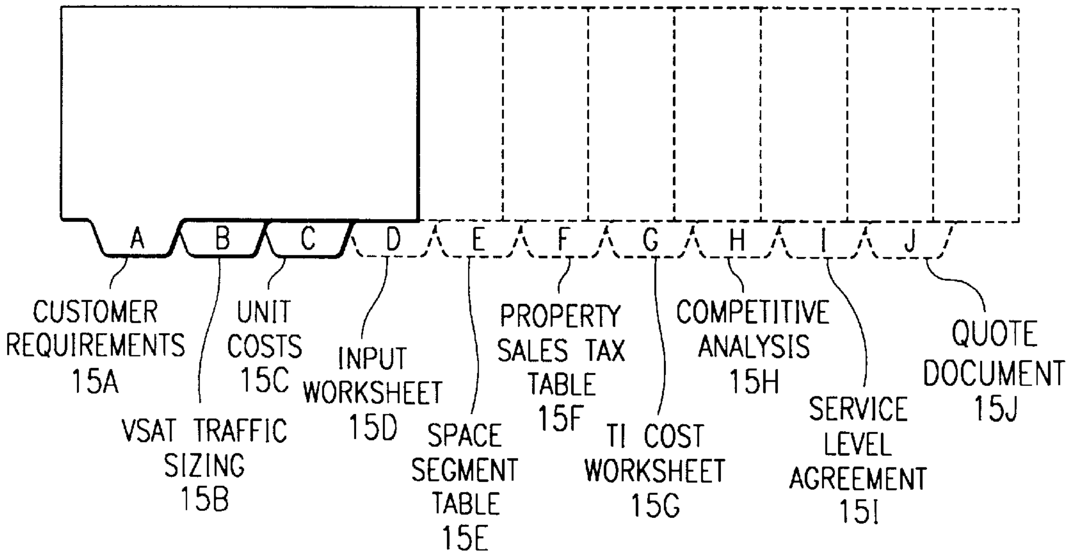
FIG. 1A illustrates an example of the automated workbook of FIG. 1.

FIG. 1A illustrates the ten worksheets 15A–15J that comprise workbook 15. An example of each is included in Appendices A–J. The following list identifies each worksheet, wherein the reference numbers correspond to the appropriate Appendix.

15A. Customer Requirements
15B. VSAT Traffic Sizing Model
15C. Unit Cost Worksheet
15D. Input Worksheet
15E. VSAT Network Space Segment Table
15F. Property/Sales Taxrate Tables
15G. Technical Infrastructure (TI) Cost Worksheet
15H. Comparative Analysis Worksheet
15I. Service Level Agreement
15J. Satellite Quote Document As indicated below, in several of the Appendices, data to be entered by the network provider is outlined in dotted lines. Other data is calculated or retrieved from other worksheets.

Figure 2:
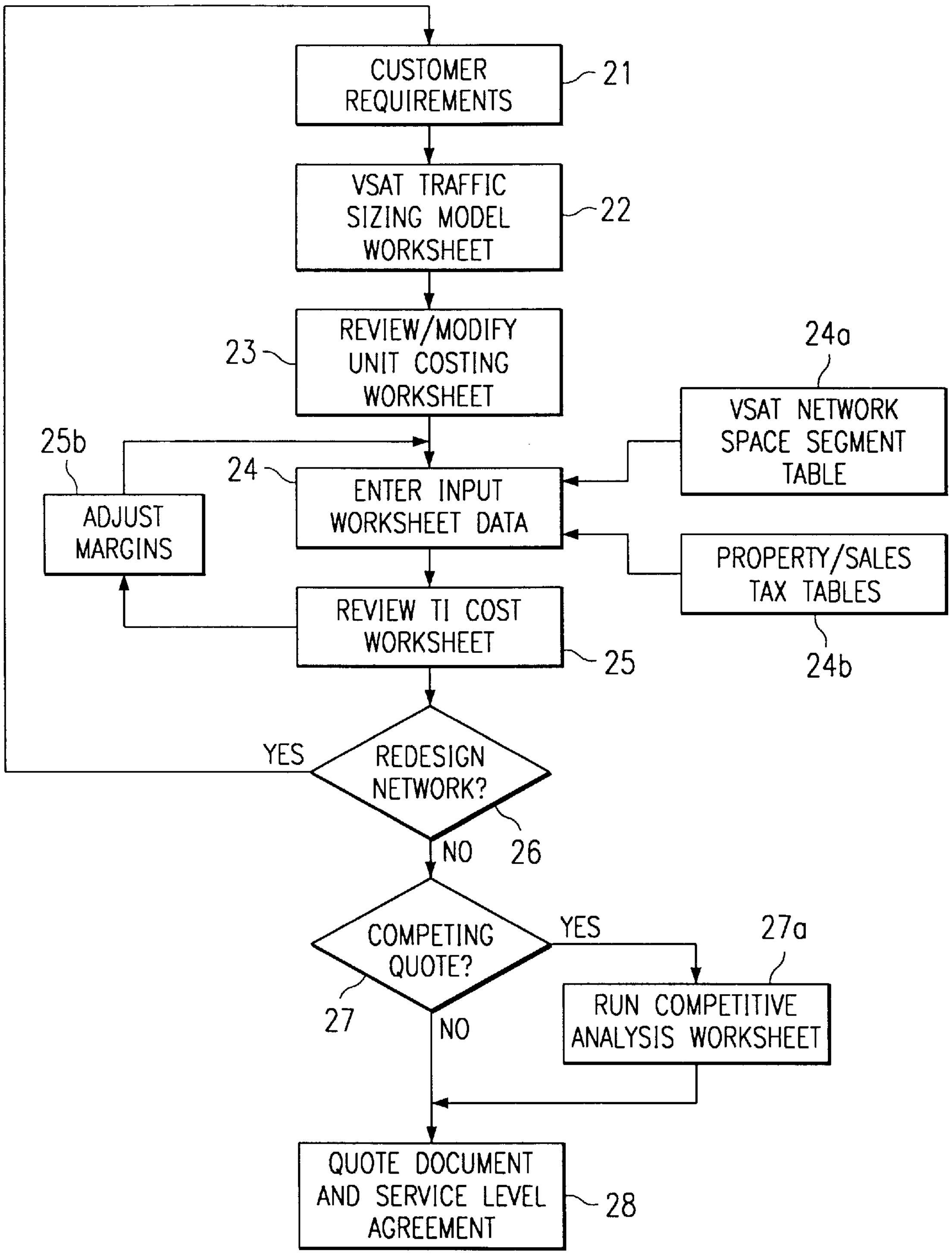
FIG. 2 illustrates an example of a method of using the workbook of FIG. 1.

FIG. 2 illustrates a method of using computer system 10, programmed to run Workbook 15, to provide sizing and pricing information for a satellite network. As explained below, each of the worksheets 15A–15J plays a unique role in the production of sizing and pricing data, and ultimately, a Quote Document 15J to be delivered to the customer. The method is performed by a network provider for a potential customer, with the aid of Workbook 15. In Step 21, the network provider uses the Customer Requirements Worksheet 15A to input data unique to the customer's communications needs. An example of the Customer Requirements Worksheet is set out in Appendix A.

Essentially, the Customer Requirements Worksheet 15A is a set of standardized questions that cover a customer's data, voice, and video network needs. The network provider ascertains this data from the customer for input to worksheet 15A. In the embodiment of FIG. 2, the network provider will subsequently use this data for other worksheets, especially the Input Worksheet 15D, and will enter the data manually to these other worksheets.

In Step 22, the network provider designs the network, s using the VSAT Traffic Sizing Worksheet 15B. An example of the VSAT Traffic Sizing Worksheets is set out in Appendix B. The Traffic Sizing Worksheet 15B provides both preliminary sizing data and an advanced sizing model. Typically, the network providers obtains preliminary sizing data to obtain "ballpark" estimates and design tentative networks.

As indicated by the dotted lines, for preliminary sizing, the network provider enters general parameters, such as the following:

Number of locations

Outroute throughput rate

Inroute thruput rate

SLIM thruput rate with 1:1 redundancy

Inroute utilization percent

SLIM utilization percent

Percentage of business day equating the PBH (peak busy hour)

The network provider also enters various additional sizing parameters, such as:

Outbound network data in bytes for the typical business day

Inbound network data in bytes for the typical business day

Total number of inbound transactions (packets) in PBH

Total number of outbound transactions (packets) in PBH

Total inbound bytes in PBH

Total outbound bytes in PBH

Byte size of file to be transmitted from hub to VSATs

Byte size of file to be transmitted from VSATs to hub

As indicated in Appendix B, preliminary sizing data is calculated in the form of hub base band equipment requirements, in several categories: interactive PBH (peak busy hour), peak busy hour transaction rates and packet size, and batch PBH sizing. The interactive PBH and batch PBH calculations include the inbound and outbound bit rates, the number of inroutes and outroutes, and the number of required SLIMs (super line interface modules). In the embodiment of FIG. 2, the network provider will manually enter there calculations to other worksheets, such as to the Input Worksheet 15D. The preliminary sizing results can be used to determine initial feasibility of providing the satellite network.

In the example of Appendix B, the advanced sizing model is one provided by the satellite service provider. The input data is in the form of customer environment, peak busy hour (PBH), and ISBN data for one or more applications (protocols). Some of this data is provided by preliminary sizing results. In the embodiment of Appendix B, this data is input manually. Numerous formulas are used to calculate sizing requirements for various applications. Then, for each protocol, a sizing report across all years in use is provided. The advanced sizing data is used prior to production of the Customer Quote Worksheet 15J to finalize network sizing requirements.

In Step 23, the network provider reviews and updates the Unit Costing Worksheet 15C, which itemizes each piece of network equipment and service. The data provided by the network provider are the "$ per unit" values, who thereby ensures that the specified cost for each unit is correct. An example of a Unit Costing Worksheet is set out in Appendix C.

The units of equipment and service are listed in four basic categories: VSAT equipment, shared/private hub services, dedicated hub equipment, and space segment equipment and usage. For each unit, the capital, nonrecurring, and recurring costs are set out. For example, Item A is for a 0.75 meter/1.0 meter antenna (referred to as a personal earth station or PES, Model 6500) and its related equipment and service fees. The unit cost of $7500 is a "bundled" capital cost, so no separate recurring or nonrecurring costs are listed. A "standard" maintenance program is assumed unless other options are selected.

As explained below, the network provider will use an Input Worksheet 15D to enter the number of units for each item. Other data, such as a project management fee per unit may also be entered to the Input Worksheet 15D. This data is automatically delivered to the Unit Costing Worksheet 15C, which then calculates various totals and subtotals.

In Step 24, the network provider enters data to the Input Worksheet 15D. An example of an Input Worksheet 15D is set out in Appendix D. The data input by the network provider is indicated in dotted lines.

The Input Worksheet 15D lists equipment and services in the same four equipment/service unit categories as the Unit Costing Worksheet 15C. For each category, the network provider manually enters the appropriate data. Much of this data is obtained from the previously completed Customer Requirements Worksheet 15A and VSAT Traffic Sizing Model Worksheet 15B.

In the category for VSAT Equipment, the network provider enters the number of units for each item to be included in the network. As stated above, this data is automatically delivered to the Unit Costing Worksheet 15C so that totals per unit can be automatically calculated.

In the Shared/Private Hub Services category, the provider enters data about the type of service to be provided. For decisions that call for "yes" and "no" data, the data is entered as a 1 or 0, respectively. Thus, in the example of Appendix D, the decision to use a particular shared hub is entered as a "1". The other options are defaulted to 0 (no). Because the hub is to be shared, a formula behind the Shared Resource cell automatically computes the customer's share of common hub resources such as the antenna and RF equipment. This formula is designed so that each customer pays for a fair share, and is thus the same for each customer. In another run for the same or another customer, a private hub might be specified and the shared resources would be computed as 100%.

Data for the Dedicated Hub Equipment Category and the Space Segment Equipment & Usage category is obtained from the VSAT Sizing Worksheet 15B. For example, as stated above, the output data from the VSAT Sizing Worksheet 15B might specify that 26 SLIMs are needed, as well as 20 inroutes and 1 outroute.

The last column of the Input Worksheet are calculated total space segment percentages for inroutes and outroutes, i.e., 33% and 4% respectively. The percentages represent usage of a satellite transponder. These percentages are obtained by inputting the number of inroutes and outroutes to VSAT Network Space Segment Table 15E. In Step 24*a*, Table 15E performs appropriate calculations. Appendix E is an example of a VSAT Network Space Segment Table 15E. It uses algorithms that determine a percentage of power and bandwidth consumption of the satellite transponder. The matrix lists percentages for any pair of inroute/outroute values. Although Appendix E lists percentages for up to 14 outroutes (512 kbps) and 19 inroutes (128 kbps), the matrix could be easily extended to list percentages for more inroutes and outroutes. Once determined, the percentage is multiplied by cost, such as a fixed cost per percent.

The Input Worksheet 15D also has a section for receiving various input modeling parameters other than the unit data of the four equipment/service unit categories. As explained below, this data is automatically delivered to a TI Cost Worksheet. Various "non-unit" costs, i.e., costs not naturally specified by unit, such as engineering design hours and project management hours, are entered and delivered to the TI Cost Worksheet 15G, which converts this data to cost data.

One such modeling parameter is property and sales tax rate data. The network provider enters appropriate geographical information for the hub and VSAT locations. In Step 24*b* tax rates are automatically provided from a Property and Sales Taxrate Table 15F. Appendix F sets out an example of Property and Sates Taxrate Table 15F. Only the values for a single state (Alaska) are printed; values for all other states would be similarly calculated. In the example of Appendix D (the Input Worksheet), the user has specified "Ohio" in the parameter section. The Input Worksheet 15D then obtains the appropriate tax data for that state from Table 15F. As indicated in Appendix F, a national tax rate is listed at the bottom, calculated as an average of all states.

At the bottom of the Input Worksheet 15D, the network provider enters non-recurring and recurring costs, herein referred to as "margin data". Using this data, a calculation provides a positive or negative margin at the end of the service term. In the example of Appendix D, non recurring and recurring costs are terms of cost per VSAT. As explained below, the TI Cost Worksheet 15G uses these costs to calculate a net value, which in turn is delivered to the Input Worksheet 15D. This calculated net value may be used as a guide to iteratively adjust non-recurring and recurring costs until a satisfactory net is obtained. For example, it might be calculated that if the customer pays a recurring cost of $XX per VSAT for X years, the network provider's net at the end of the service term would be YY%.

Step 25 is using the Technical Infrastructure (TI) Cost Worksheet 15G to review the feasibility of the project and prices. An example of a TI Cost Worksheet 15G is set out in Appendix G.

The TI Cost Worksheet 15G is essentially calculated values, using data automatically retrieved from other worksheets. This data is organized over a desired time space (i.e., five years), with totals. A feature of the TI Cost Worksheet 15G is that it sets out financial information in a format especially useful for the network service provider's internal financial records. Thus, financial data is presented on a year by year basis; capital, recurring, and non-recurring costs are separated. Overhead is calculated into a net cash flow. Additional charts and graphs could also be included.

As stated above, one set of calculations provided by the TI Cost Worksheet 15C results in net values, in terms of both dollars and percentages. These net values are calculated for each year of the project, as well as an average net over all years. In Step 25*b,* these net values are provided to the Input Worksheet 15D as described above in connection with Step 24.

In Step 26, it is determined whether the proposed network must be redesigned to met cost constraints. If so, Steps 21–25 are repeated until both the network design and the costs are satisfactory. For example, if a first design was for a network with a private hub, and second design might be for a network with a shared hub. If no redesign is necessary, the process proceeds to Step 27.

In Step 27, it is determined whether the customer requires a comparison with a competing network provider. If so, in Step 27*a,* the Competitive Analysis Worksheet 15H permits a competing quote to be usefully compared. The Worksheet 15H lists categories of network equipment and services. The scope of each category is such that a competing quote can be readily "fit" into these categories. In other words, the categories are sufficiently broad to permit comparison of like units and sufficiently narrow so as to provide a meaningful comparison. The network provider's costs are automatically listed in each category, using data retrieved from other worksheets. The network provider enters the competitor's cost data. The Competitive Analysis Worksheet 15H then automatically calculates differences in terms of percentages. If no competitive Analysis Worksheet 15H is required, the process proceeds to Step 28.

In Step 28, the Service Level Agreement 15J and Quote Document 15J are produced. Examples of these documents are set out in Appendix I and Appendix J, respectively. The Quote Document 15J automatically receives data from other worksheets, especially from the Input Worksheet 15D and TI Cost Worksheet 15G to calculate final quote values for the proposed network. If multiple designs have been evaluated, quotes for each design are provided.

Other Embodiments

Although the present invention has been described in detail, it should be understood that various changes, substitutions, and alterations can be made hereto without departing from the spirit and scope of the invention as defined by the appended claims.

Appendix A

©1998 Electronic Data Systems Corporation

Customer Requirements

1) Approximate date of required services? ________

2) City/State/Province of remote locations? ________

3) Service Type(s): Two-way data, two-way voice, one-way video/data/audio broadcasting, two-way video conferencing?

4) Two-way data requirements:

a. Current bandwidth? ________ b. Protocol(s)? ________ c. Physical interface ? ________ d. Response time requirement? ________ e. Number of locations? ________

5) Two-way Voice a. Compressed or PCM? ________ b. Interface type (2 wire or 4 wire)? ________ c. PBX to PBX or telephone to telephone, identify types? ________ d. Call blocking (%)? ________ e. Number of locations? ________

6) One-way Video, Data and/or Audio a. Broadcast video media - live, tape? ________ b. Data file size? ________ c. Data delivery requirements (acknowledged or no receipt acknowledgment) ? ________ d. Audio music or squawk? ________ e. Number of broadcasts per month (identify separately for video, data and audio if it varies)?

f. Number of locations (identify separately for video, data and audio if it varies)?

7) Two-way Video Conferencing?

a. Conference point to point or multipoint, specify locations?

b. PC conference or full service conferencing (group viewing, transparencies, fax, ...)?

c. Dedicated or occasional use?

8) Will the customer is responsible for site permits and civil works? ________

9) Will the customer own the VSAT equipment? ________

10) Processing point? ________

11) Host or FEP types? ________

12) Host or FEP protocols? ________

13) Network availability requirement? ________

14) Data Traffic information:

a. Peak busy hour(s)? ________ b. Interactive (at peak busy hour)

1. Inbound packet size? ________

2. Inbound transaction rate? ________

3. Outbound packet size? ________

4. Outbound transaction rate? ________ c. Batch File Retrieval

1. File size(s)? ________

2. Number of consecutive files? ________

3. Time requirement for retrieval? ________

4. Retrieved at peak busy hour? ________

Appendix B

©1998 Electronic Data Systems Corporation

Sizing Models

Use the preliminary sizing model for budgetary costing purposes when network estimation and ballpark pricing is required. Advanced and simulation modeling by the vendor is advised before final pricing is delivered.

Preliminary Sizing

General Parameters

2300 Number of locations
400,000 Outroute thruput rate
100,000 Inroute thruput rate
400,000 SLIM thruput rate w/ 1:1 redundancy
50% Inroute Utilization %
50% SLIM Utilization %
20% Percentage of business day equating the PBH* (interactive only)

*PBH - Peak Busy Hour

Determining Sizing based on the Interactive PBH

1,200,000,000 Outbound network data in bytes for the typical business day
100,000,000 Inbound network data in bytes for the typical business day

| TIME | OUTBOUND | INBOUND | OUTROUTES | INROUTES | 400Mbps SLIMS |
|---|---|---|---|---|---|
| Interactive PBH | 533,333 BPS | 44,444 BPS | 1.33 | 0.9 | 5.8 |

Determining the Transaction Rate in the PBH and Packet Sizing

5000 Total number of inbound transactions (packets) in PBH
9000 Total number of outbound transactions (packets) in PBH
100,000 Total inbound bytes in PBH
900,000 Total outbound bytes in PBH 0.044444444 Inbound Transaction Rate (transactions per second)
0.222222222 Outbound Transaction Rate (transactions per second)

20 Avg. Inbound Packet Size in bytes
100 Avg. Outbound Packet Size in bytes

Determining Sizing based on the Batch PBH

3,000,000,000 byte size of file to be tranmitted from Hub to VSATs
10,000,000 byte size of file to be tranmitted from VSATs to Hub

| TIME | OUTBOUND | INBOUND | OUTROUTES | INROUTES | 400Mbps SLIMS |
|---|---|---|---|---|---|
| PER MONTH | 9,259 BPS | 70,988 BPS | 1.0 | 1.4 | 0.8 |
| PER WEEK | 39,683 BPS | 304,233 BPS | 1.0 | 6.1 | 3.4 |
| PER DAY | 277,778 BPS | 2,129,630 BPS | 1.0 | 42.6 | 24.1 |
| PER 12 HOUR | 555,556 BPS | 4,259,259 BPS | 1.4 | 85.2 | 48.1 |
| PER 6 HOUR | 1,111,111 BPS | 8,518,519 BPS | 2.8 | 170.4 | 96.3 |

Advanced Sizing Model (omitted)

Appendix C

©1998 Electronic Data Systems Corporatio

VSATpricing98c xls

24

UNIT COSTING SPREADSHEET

VSAT EQUIPMENT & OPTIONS

| | | | | | | | |
|---|---|---|---|---|---|---|---|
| | | OLD | NEW | $ PER | $ PER | TOTAL | |
| | UNIT DESCRIPTION | OLD UNITS | NEW UNITS | OLD UNIT | NEW UNIT | COST | COMMENTS |
| A. | • .75M/1.0M VSAT(s), PES 6500 | 0 | 0 | $0 | $0 | $0 | INCLUDES .75/1M PES 6500; 2 PORT MPC; BALLAST MNT, ACHORED |
| | - BALLAST MOUNT | | | $0 | $0 | $0 | BALLAST OR PLATE MAST MNT; SITE SURVEY (AS NECESSARY); PERMIT |
| | | | | | | | AS REQUIRED (IF HNS ALLOWED TO DETERMINE); SHIPPING TO SITE; |
| | SUBTOTAL CAPITAL | | | $0 | $0 | $0 | 125 PVC IFL; INSTALL, COMMISSIONING, CUTOVER (50'CABLE TO DTE) |
| | | OLD | NEW | COST PER | | | |
| | UNIT DESCRIPTION | OLD UNITS | NEW UNITS | UNIT | | TYPE $ | COMMENTS |
| | | 0 | 0 | | | | **OPTIONAL** |
| | - BALLAST MOUNT INSTALL | | | $0 | | NRC | VIDEOSTAR BALLAST MOUNT INSTALL INCLUDES: SITE SURVEY, 100' |
| | | | | | | | OF PVC IFL CABLE, VSAT INSTALL, COMMISSIONING & SAME DAY CUT |
| | - MAINTENANCE CERTIF. | | | $0 | | NRC | HNS POST-INSTALL MAINTENANCE CERTIFICATION |
| | - PERMITS | | | $0 | | NRC | VIDEOSTAR PERMITTING - BUILDING PERMITS INCLUDE: $75. DIRECT |
| | | | | | | | COSTS AND 3 MANHRS OF LABOR |
| | - HNS PROJ. MGM'T FEE | | | #DIV/0! | | NRC | HNS 4% MGM'T FEE BASED ON HNS ACQUIRED CAPITAL (1.8M VSAT) |
| | SUBTOTAL NRC | $0 | $0 | $0 | | | |
| | UNIT DESCRIPTION | | UNITS | COST/UNIT | | TYPE $ | COMMENTS |
| | | | 0 | | | | |
| | - VSAT MAINTENANCE | | | $0.00 | | MO. RC | 8AM-5PM VSAT MO. MAINTENANCE, INCLUDES 1 DATA PORT CARD |
| | - FCC VSAT USER FEE | | | $0.00 | | | |
| | TOTAL RECURRING | | | $0.00 | | | |
| | - CIVIL WORKS | | | T&M + | | NRC | ELECTRICAL WORK (DEICING) & IFL ROUTING PREP - IF REQ'D |
| | | OLD | NEW | $ PER | $ PER | TOTAL | |
| | UNIT DESCRIPTION | OLD UNITS | NEW UNITS | OLD UNIT | NEW UNIT | COST | COMMENTS |
| B. | • 1.0/1.2M VSAT(s), PES 5000 | 0 | 0 | $0 | $0 | $0 | INCLUDES 1.2M PES 5000; TPC card w/ 2 serial PORTs: BALLAST MNT, ACHORED BALLAST OR |
| | - BALLAST MOUNT | | | $0 | $0 | $0 | PLATE MAST MNT; SITE SURVEY (AS NECESSARY); PERMIT AS REQUIRED (IF |
| | | | | | | | HNS ALLOWED TO DETERMINE). NOT TO EXCEED $2500; SHIPPING TO SITE; |
| | SUBTOTAL CAPITAL | | | $0 | $0 | $0 | 125'PVC IFL; INSTALL, COMMISSIONING, CUTOVER (50'CABLE TO DTE) |
| | | OLD | NEW | COST PER | | | |
| | UNIT DESCRIPTION | OLD UNITS | NEW UNITS | UNIT | | TYPE $ | COMMENTS |
| | | 0 | 0 | | | | **OPTIONAL** |
| | - BALLAST MOUNT INSTALL | | | $0 | | NRC | VIDEOSTAR BALLAST MOUNT INSTALL INCLUDES: SITE SURVEY, 100' |
| | | | | | | | OF PVC IFL CABLE, VSAT INSTALL, COMMISSIONING & SAME DAY CUT |
| | - MAINTENANCE CERTIF. | | | $0 | | NRC | HNS POST-INSTALL MAINTENANCE CERTIFICATION |
| | - PERMITS | | | $0 | | NRC | VIDEOSTAR PERMITTING - BUILDING PERMITS INCLUDE: $75. DIRECT |
| | | | | | | | COSTS AND 3 MANHRS OF LABOR |
| | - HNS PROJ. MGM'T FEE | | | #DIV/0! | | NRC | HNS 4% MGM'T FEE BASED ON HNS ACQUIRED CAPITAL (1.8M VSAT) |
| | SUBTOTAL NRC | $0 | $0 | $0 | | | |
| | UNIT DESCRIPTION | | UNITS | COST/UNIT | | TYPE $ | COMMENTS |
| | | | 0 | | | | |
| | - VSAT MAINTENANCE | | | $0.00 | | MO. RC | 8AM-5PM VSAT MO. MAINTENANCE, INCLUDES 1 DATA PORT CARD |
| | | | | $0 | | | 77.19 |
| | TOTAL RECURRING | | | $0.00 | | | |
| | - VSAT RC LEASE | | | $0.00 | | | Includes base: 1.0/1.2m package from HNS w/ TPC |
| | - CIVIL WORKS | | | T&M + | | NRC | ELECTRICAL WORK (DEICING) & IFL ROUTING PREP - IF REQ'D |

VSATpricing98c xls

25

| | | | | | | | |
|---|---|---|---|---|---|---|---|
| | | OLD | NEW | $ PER | $ PER | TOTAL | |
| | UNIT DESCRIPTION | OLD UNITS | NEW UNITS | OLD UNIT | NEW UNIT | COST | COMMENTS |
| C. | • 1.8M VSAT(s), PES 5000 | 0 | 0 | $0 | $0 | $0 | INCLUDES 1.8M PES 5000; 2 PORT MPC; BALLAST MNT, ACHORED BALLAST OR |
| | - BALLAST MOUNT | | | $0 | $0 | $0 | PLATE MAST MNT; SITE SURVEY (AS NECESSARY); PERMIT AS REQUIRED (IF |
| | | | | | | | HNS ALLOWED TO DETERMINE), NOT TO EXCEED $2500; SHIPPING TO SITE; |
| | SUBTOTAL CAPITAL | | | $0 | $0 | $0 | 125' PVC IFL; INSTALL, COMMISSIONING, CUTOVER (50'CABLE TO DTE) |
| | | OLD | NEW | COST PER | | | |
| | UNIT DESCRIPTION | OLD UNITS | NEW UNITS | UNIT | | TYPE $ | COMMENTS |
| | | 0 | 0 | | | | **OPTIONAL** |
| | - BALLAST MOUNT INSTALL | | | $0 | | NRC | VIDEOSTAR BALLAST MOUNT INSTALL INCLUDES: SITE SURVEY, 100' |
| | | | | | | | OF PVC IFL CABLE, VSAT INSTALL, COMMISSIONING & SAME DAY CUT |
| | - MAINTENANCE CERTIF. | | | $0 | | NRC | HNS POST-INSTALL MAINTENANCE CERTIFICATION |
| | - PERMITS | | | $0 | | NRC | VIDEOSTAR PERMITTING - BUILDING PERMITS INCLUDE: $75. DIRECT |
| | | | | | | | COSTS AND 3 MANHRS OF LABOR |
| | - HNS PROJ. MGM'T FEE | | | #DIV/0! | | NRC | HNS 4% MGM'T FEE BASED ON HNS ACQUIRED CAPITAL (1.8M VSAT) |
| | SUBTOTAL NRC | $0 | $0 | $0 | | | |
| | UNIT DESCRIPTION | | UNITS | COST/UNIT | | TYPE $ | COMMENTS |
| | | | 0 | | | | |
| | - VSAT MAINTENANCE | | | $0.00 | | MO. RC | 8AM-5PM VSAT MO. MAINTENANCE, INCLUDES 1 DATA PORT CARD |
| | - FCC VSAT USER FEE | | | $0.00 | | | FCC PROPOSED CHARGE OF $20/VSAT/YR |
| | TOTAL RECURRING | | | $0.00 | | | |
| | - CIVIL WORKS | | | T&M + | | NRC | ELECTRICAL WORK (DEICING) & IFL ROUTING PREP - IF REQ'D |
| | | OLD | NEW | $ PER | $ PER | TOTAL | |
| | UNIT DESCRIPTION | OLD UNITS | NEW UNITS | OLD UNIT | NEW UNIT | COST | COMMENTS |
| D. | • 2.4M VSAT(s), PES 6500 | 0 | 0 | $0 | $0 | $0 | INCLUDES 2.4M PES 6500; 2 PORT MPC; BALLAST OR PIPE MNT. |
| | - BALLAST MOUNT | | | $0 | $0 | $0 | SITE SURVEY (AS NECESSARY); PERMIT |
| | | | | | | | AS REQUIRED (IF HNS ALLOWED TO DETERMINE); SHIPPING TO SITE; |
| | SUBTOTAL CAPITAL | | | $0 | $0 | $0 | 125' PVC IFL; INSTALL, COMMISSIONING, CUTOVER (50'CABLE TO DTE) |
| | | OLD | NEW | COST PER | | | |
| | UNIT DESCRIPTION | OLD UNITS | NEW UNITS | UNIT | | TYPE $ | COMMENTS |
| | | 0 | 0 | | | | **OPTIONAL** |
| | - BALLAST MOUNT INSTALL | | | $0 | | NRC | VIDEOSTAR GROUND MOUNT INSTALLATION INCLUDES: SITE SURVEY, |
| | | | | | | | 100' OF PVC IFL CABLE, INSTALL, COMMISSIONING, AND SAME DAY CUTOVER |
| | - MAINTENANCE CERTIF. | | | $0 | | NRC | HNS POST-INSTALL MAINTENANCE CERTIFICATION |
| | - PERMITS | | | $0 | | NRC | VIDEOSTAR PERMITTING - BUILDING PERMITS INCLUDE: $75. DIRECT |
| | | | | | | | COSTS AND 3 MANHRS OF LABOR |
| | - HNS PROJ. MGM'T FEE | | | #DIV/0! | | NRC | HNS 4% MGM'T FEE BASED ON HNS ACQUIRED CAPITAL (1.8M VSAT) |
| | SUBTOTAL NRC | $0 | $0 | $0 | | | |
| | UNIT DESCRIPTION | | UNITS | COST/UNIT | | TYPE $ | COMMENTS |
| | - MAINTENANCE | | 0 | $0 | | MO. RC | 8AM-5PM VSAT MO. MAINTENANCE, INCLUDES 1 DATA PORT CARD |
| | - FCC VSAT USER FEE | | | $0.00 | | | |
| | TOTAL RECURRING | | | $0.00 | | | |
| | - CIVIL WORKS | | | T&M + | | NRC | ELECTRICAL WORK (DEICING) & IFL ROUTING PREP - IF REQ'D |

VSATpricing98c xls

26

| | | | | | | | |
|---|---|---|---|---|---|---|---|
| | | OLD | NEW | $ PER | $ PER | TOTAL | |
| | UNIT DESCRIPTION | OLD UNITS | NEW UNITS | OLD UNIT | NEW UNIT | COST | COMMENTS |
| E. | • .75M/1.0M VSAT(s), PES 8000 | 0 | 0 | $0 | $0 | $0 | INCLUDES .75/1M PES 8000; 2 PORT MPC; BALLAST MNT. ACHORED |
| | - BALLAST MOUNT | | | $0 | $0 | $0 | BALLAST OR PLATE MAST MNT; SITE SURVEY (AS NECESSARY); PERMIT |
| | | | | | | | AS REQUIRED (IF HNS ALLOWED TO DETERMINE); SHIPPING TO SITE; |
| | SUBTOTAL CAPITAL | | | $0 | $0 | $0 | 125' PVC IFL; INSTALL, COMMISSIONING, CUTOVER (50' CABLE TO DTE) |
| | | OLD | NEW | COST PER | | | |
| | UNIT DESCRIPTION | OLD UNITS | NEW UNITS | UNIT | | TYPE $ | COMMENTS |
| | | 0 | 0 | | | | **OPTIONAL** |
| | - BALLAST MOUNT INSTALL | | | $0 | | NRC | VIDEOSTAR BALLAST MOUNT INSTALL INCLUDES: SITE SURVEY, 100' |
| | | | | | | | OF PVC IFL CABLE, VSAT INSTALL, COMMISSIONING & SAME DAY CUT |
| | - MAINTENANCE CERTIF. | | | $0 | | NRC | HNS POST-INSTALL MAINTENANCE CERTIFICATION |
| | - PERMITS | | | $0 | | NRC | VIDEOSTAR PERMITTING - BUILDING PERMITS INCLUDE: $75. DIRECT |
| | | | | | | | COSTS AND 3 MANHRS OF LABOR |
| | - HNS PROJ. MGM'T FEE | | | #DIV/0! | | NRC | HNS 4% MGM'T FEE BASED ON HNS ACQUIRED CAPITAL (1.8M VSAT) |
| | SUBTOTAL NRC | $0 | $0 | $0 | | | |
| | UNIT DESCRIPTION | | UNITS | COST/UNIT | | TYPE $ | COMMENTS |
| | | | 0 | | | | |
| | - VSAT MAINTENANCE | | | $0.00 | | MO. RC | 8AM-5PM VSAT MO. MAINTENANCE, INCLUDES 1 DATA PORT CARD |
| | - FCC VSAT USER FEE | | | $0.00 | | | |
| | TOTAL RECURRING | | | $0.00 | | | |
| | - CIVIL WORKS | | | T&M + | | NRC | ELECTRICAL WORK (DEICING) & IFL ROUTING PREP - IF REQ'D |

| | | | | | | | |
|---|---|---|---|---|---|---|---|
| | | OLD | NEW | $ PER | $ PER | TOTAL | |
| | UNIT DESCRIPTION | OLD UNITS | NEW UNITS | OLD UNIT | NEW UNIT | COST | COMMENTS |
| F. | • 1.2M VSAT(s), PES 8000 | 0 | 0 | $0 | $0 | $0 | INCLUDES 1.2M PES 8000; 2 PORT MPC; BALLAST MNT. ACHORED |
| | - BALLAST MOUNT | | | $0 | $0 | $0 | BALLAST OR PLATE MAST MNT; SITE SURVEY (AS NECESSARY); PERMIT |
| | | | | | | | AS REQUIRED (IF HNS ALLOWED TO DETERMINE); SHIPPING TO SITE; |
| | SUBTOTAL CAPITAL | | | $0 | $0 | $0 | 125' PVC IFL; INSTALL, COMMISSIONING, CUTOVER (50' CABLE TO DTE) |
| | | OLD | NEW | COST PER | | | |
| | UNIT DESCRIPTION | OLD UNITS | NEW UNITS | UNIT | | TYPE $ | COMMENTS |
| | | 0 | 0 | | | | **OPTIONAL** |
| | - BALLAST MOUNT INSTALL | | | $0 | | NRC | VIDEOSTAR BALLAST MOUNT INSTALL INCLUDES: SITE SURVEY, 100' |
| | | | | | | | OF PVC IFL CABLE, VSAT INSTALL, COMMISSIONING & SAME DAY CUT |
| | - MAINTENANCE CERTIF. | | | $0 | | NRC | HNS POST-INSTALL MAINTENANCE CERTIFICATION |
| | - PERMITS | | | $0 | | NRC | VIDEOSTAR PERMITTING - BUILDING PERMITS INCLUDE: $75 DIRECT |
| | | | | | | | COSTS AND 3 MANHRS OF LABOR |
| | - HNS PROJ. MGM'T FEE | | | #DIV/0! | | NRC | HNS 4% MGM'T FEE BASED ON HNS ACQUIRED CAPITAL (1.8M VSAT) |
| | SUBTOTAL NRC | $0 | $0 | $0 | | | |
| | UNIT DESCRIPTION | | UNITS | COST/UNIT | | TYPE $ | COMMENTS |
| | | | 0 | | | | |
| | - VSAT MAINTENANCE | | | $0.00 | | MO. RC | 8AM-5PM VSAT MO. MAINTENANCE, INCLUDES 1 DATA PORT CARD |
| | - FCC VSAT USER FEE | | | $0.00 | | | |
| | TOTAL RECURRING | | | $0.00 | | | |
| | - CIVIL WORKS | | | T&M + | | NRC | ELECTRICAL WORK (DEICING) & IFL ROUTING PREP - IF REQ'D |

VSATpricing98c xls

27

| | | | | | | | |
|---|---|---|---|---|---|---|---|
| | | OLD | NEW | $ PER | $ PER | TOTAL | |
| | UNIT DESCRIPTION | OLD UNITS | NEW UNITS | OLD UNIT | NEW UNIT | COST | COMMENTS |
| G. | • 1.8M VSAT(s), PES 8000 | 0 | 0 | $0 | $0 | $0 | INCLUDES 1.8M PES 8000; 2 PORT MPC; BALLAST MNT. |
| | - BALLAST MOUNT | | | $0 | $0 | $0 | SITE SURVEY (AS NECESSARY); PERMIT |
| | | | | | | | AS REQUIRED (IF HNS ALLOWED TO DETERMINE); SHIPPING TO SITE; |
| | SUBTOTAL CAPITAL | | | $0 | $0 | $0 | 125' PVC IFL; INSTALL, COMMISSIONING, CUTOVER (50' CABLE TO DTE) |
| | | OLD | NEW | COST PER | | | |
| | UNIT DESCRIPTION | OLD UNITS | NEW UNITS | UNIT | | TYPE $ | COMMENTS |
| | | 0 | 0 | | | | **OPTIONAL** |
| | - BALLAST MOUNT INSTALL | | | $0 | | NRC | VIDEOSTAR BALLAST MOUNT INSTALL INCLUDES: SITE SURVEY, 100' |
| | | | | | | | OF PVC IFL CABLE, VSAT INSTALL, COMMISSIONING & SAME DAY CUT |
| | - MAINTENANCE CERTIF. | | | $0 | | NRC | HNS POST-INSTALL MAINTENANCE CERTIFICATION |
| | - PERMITS | | | $0 | | NRC | VIDEOSTAR PERMITTING - BUILDING PERMITS INCLUDE: $75. DIRECT |
| | | | | | | | COSTS AND 3 MANHRS OF LABOR |
| | - HNS PROJ. MGM'T FEE | | | #DIV/0! | | NRC | HNS 4% MGM'T FEE BASED ON HNS ACQUIRED CAPITAL (1.8M VSAT) |
| | SUBTOTAL NRC | $0 | $0 | $0 | | | |
| | UNIT DESCRIPTION | | UNITS | COST/UNIT | | TYPE $ | COMMENTS |
| | | | 0 | | | | |
| | - VSAT MAINTENANCE | | | $0.00 | | MO. NRC | 8AM-5PM VSAT MO. MAINTENANCE, INCLUDES 1 DATA PORT CARD |
| | - FCC VSAT USER FEE | | | $0.00 | | | FCC PROPOSED CHARGE OF $20/VSAT/YR |
| | TOTAL RECURRING | | | $0.00 | | | |
| | - CIVIL WORKS | | | T&M + | | NRC | ELECTRICAL WORK (DEICING) & IFL ROUTING PREP - IF REQ'D |
| | | OLD | NEW | $ PER | $ PER | TOTAL | |
| | UNIT DESCRIPTION | OLD UNITS | NEW UNITS | OLD UNIT | NEW UNIT | COST | COMMENTS |
| H. | • 2.4M VSAT(s), PES 8000 | 0 | 0 | $0 | $0 | $0 | INCLUDES 2.4M PES 8000; 2 PORT MPC; BALLAST OR PIPE MNT. |
| | - BALLAST MOUNT | | | $0 | $0 | $0 | SITE SURVEY (AS NECESSARY); PERMIT |
| | | | | | | | AS REQUIRED (IF HNS ALLOWED TO DETERMINE); SHIPPING TO SITE; |
| | SUBTOTAL CAPITAL | | | $0 | $0 | $0 | 125' PVC IFL; INSTALL, COMMISSIONING, CUTOVER (50' CABLE TO DTE) |
| | | OLD | NEW | COST PER | | | |
| | UNIT DESCRIPTION | OLD UNITS | NEW UNITS | UNIT | | TYPE $ | COMMENTS |
| | | 0 | 0 | | | | **OPTIONAL** |
| | | | | $0 | | | VIDEOSTAR GROUND MOUNT INSTALLATION INCLUDES: SITE SURVEY, |
| | - BALLAST MOUNT INSTALL | | | | | NRC | 100' OF PVC IFL CABLE, INSTALL, COMMISSIONING, AND SAME DAY CUTOVER |
| | - MAINTENANCE CERTIF. | | | $0 | | NRC | HNS POST-INSTALL MAINTENANCE CERTIFICATION |
| | - PERMITS | | | $0 | | NRC | VIDEOSTAR PERMITTING - BUILDING PERMITS INCLUDE: $75. DIRECT |
| | | | | | | | COSTS AND 3 MANHRS OF LABOR |
| | - HNS PROJ. MGM'T FEE | | | #DIV/0! | | NRC | HNS 4% MGM'T FEE BASED ON HNS ACQUIRED CAPITAL (1.8M VSAT) |
| | SUBTOTAL NRC | $0 | $0 | $0 | | | |
| | UNIT DESCRIPTION | | UNITS | COST/UNIT | | TYPE $ | COMMENTS |
| | - MAINTENANCE | | 0 | $0 | | MO. RC | 8AM-5PM VSAT MO. MAINTENANCE, INCLUDES 1 DATA PORT CARD |
| | - FCC VSAT USER FEE | | | $0.00 | | | |
| | TOTAL RECURRING | | | $0.00 | | | |
| | - CIVIL WORKS | | | T&M + | | NRC | ELECTRICAL WORK (DEICING) & IFL ROUTING PREP - IF REQ'D |
| | | OLD | NEW | $ PER | $ PER | TOTAL | |
| | UNIT DESCRIPTION | OLD UNITS | NEW UNITS | OLD UNIT | NEW UNIT | COST | COMMENTS |
| I. | • 1.0M ACTIVE DEICING | 0 | 0 | | $0 | $0 | APPLIANCE DEICER FOR .75 AND 1 METER ANTENNAS |
| | DEICING INSTALLATION | | | $0 | $0 | $0 | |
| | SUBTOTAL CAPITAL | | | | | | |
| | | | | $0 | $0 | $0 | |
| | | OLD | NEW | COST PER | | | |
| | UNIT DESCRIPTION | OLD UNITS | NEW UNITS | UNIT | | TYPE $ | COMMENTS |
| | HNS PROJ. MGM'T FEE | 0 | 0 | #DIV/0! | | NRC | HNS 4% MGM'T FEE BASED ON HNS ACQUIRED CAPITAL (1.8M VSAT) |
| | SUBTOTAL NRC | $0 | $0 | $0 | | | |
| | UNIT DESCRIPTION | | UNITS | COST/UNIT | | TYPE $ | COMMENTS |
| | MAINTENANCE | | 0 | $0 | | RC | |
| | TOTAL RECURRING | | | $0 | | | |

VSATpricing98c xls

28

| | | | | | | | |
|---|---|---|---|---|---|---|---|
| | | OLD | NEW | $ PER | $ PER | TOTAL | |
| | UNIT DESCRIPTION | OLD UNITS | NEW UNITS | OLD UNIT | NEW UNIT | COST | COMMENTS |
| J. | • 1.2M ACTIVE DEICING | 0 | 0 | | $0 | $0 | APPLIANCE DEICER FOR .75 AND 1 METER ANTENNAS |
| | DEICING INSTALLATION | | | $0 | $0 | $0 | 1/2 REFLECTOR REYCHEM ACTIVE DEICING; INSTALL AT SAME TIME AS PES |
| | | | | | | | ASSUMES AVAILABILITY OF CKT BREAKER PANEL CAPABLE OF SUPPORTING |
| | | | | | | | DEICING WITHIN 250 FEET |
| | SUBTOTAL CAPITAL | | | $0 | $0 | $0 | |
| | | OLD | NEW | COST PER | | | |
| | UNIT DESCRIPTION | OLD UNITS | NEW UNITS | UNIT | | TYPE $ | COMMENTS |
| | HNS PROJ. MGM'T FEE | 0 | 0 | #DIV/0! | | NRC | HNS 4% MGM'T FEE BASED ON HNS ACQUIRED CAPITAL (1.8M VSAT) |
| | SUBTOTAL NRC | $0 | $0 | $0 | | | |
| | UNIT DESCRIPTION | | UNITS | COST/UNIT | | TYPE $ | COMMENTS |
| | MAINTENANCE | | 0 | $0 | | RC | |
| | TOTAL RECURRING | | | $0 | | | |
| | | OLD | NEW | $ PER | $ PER | TOTAL | |
| | UNIT DESCRIPTION | OLD UNITS | NEW UNITS | OLD UNIT | NEW UNIT | COST | COMMENTS |
| K. | • 1.8M ACTIVE DEICING | 0 | 0 | | $0 | $0 | 1/2 REFLECTOR REYCHEM ACTIVE DEICING; INSTALL AT SAME TIME AS PES |
| | DEICING INSTALLATION | | | $0 | $0 | $0 | ASSUMES AVAILABILITY OF CKT BREAKER PANEL CAPABLE OF SUPPORTING |
| | | | | | | | DEICING WITHIN 250 FEET |
| | SUBTOTAL CAPITAL | | | $0 | $0 | $0 | |
| | | OLD | NEW | COST PER | | | |
| | UNIT DESCRIPTION | OLD UNITS | NEW UNITS | UNIT | | TYPE $ | COMMENTS |
| | HNS PROJ. MGM'T FEE | 0 | 0 | #DIV/0! | | NRC | HNS 4% MGM'T FEE BASED ON HNS ACQUIRED CAPITAL (1.8M VSAT) |
| | SUBTOTAL NRC | $0 | $0 | $0 | | | |
| | UNIT DESCRIPTION | | UNITS | COST/UNIT | | TYPE $ | COMMENTS |
| | MAINTENANCE | | 0 | $0 | | RC | |
| | TOTAL RECURRING | | | $0 | | | |
| | | OLD | NEW | $ PER | $ PER | TOTAL | |
| | UNIT DESCRIPTION | OLD UNITS | NEW UNITS | OLD UNIT | NEW UNIT | COST | COMMENTS |
| L. | • 2.4M ACTIVE DEICING | 0 | 0 | | $0 | $0 | |
| | DEICING INSTALLATION | | | $0 | $0 | $0 | 1/2 REFLECTOR REYCHEM ACTIVE DEICING; INSTALL AT SAME TIME AS PES |
| | | | | | | | ASSUMES AVAILABILITY OF CKT BREAKER PANEL CAPABLE OF SUPPORTING |
| | | | | | | | DEICING WITHIN 250 FEET |
| | SUBTOTAL CAPITAL | | | $0 | $0 | $0 | |
| | | OLD | NEW | COST PER | | | |
| | UNIT DESCRIPTION | OLD UNITS | NEW UNITS | UNIT | | TYPE $ | COMMENTS |
| | HNS PROJ. MGM'T FEE | 0 | 0 | #DIV/0! | | NRC | HNS 4% MGM'T FEE BASED ON HNS ACQUIRED CAPITAL (1.8M VSAT) |
| | SUBTOTAL NRC | $0 | $0 | $0 | | | |
| | UNIT DESCRIPTION | | UNITS | COST/UNIT | | TYPE $ | COMMENTS |
| | MAINTENANCE | | 0 | $0 | | RC | |
| | TOTAL RECURRING | | | $0 | | | |

VSATpricing98c xls

29

| | | | | | | | |
|---|---|---|---|---|---|---|---|
| | | OLD | NEW | $ PER | $ PER | TOTAL | |
| | UNIT DESCRIPTION | OLD UNITS | NEW UNITS | OLD UNIT | NEW UNIT | COST | COMMENTS |
| M. | • 1W/2W - RFH/ODU | 0 | 0 | | $0 | $0 | |
| | RFH OR ODU INSTALL | | | $0 | $0 | $0 | ENGINEERING DESIGN RELATED TO NETWORK AVAILABILITY AS REQ'D |
| | | | | | | | CALCULATED ON DISTANCE FROM A SERVICE CENTER, ONLY APPLIES IF |
| | | | | | | | RETROFITTED AFTER INTIAL VSAT INSTALL |
| | SUBTOTAL CAPITAL | | | $0 | $0 | $0 | |
| | | OLD | NEW | COST PER | | | |
| | UNIT DESCRIPTION | OLD UNITS | NEW UNITS | UNIT | | TYPE $ | COMMENTS |
| | HNS PROJ. MGM'T FEE | 0 | 0 | #DIV/0! | | NRC | HNS 4% MGM'T FEE BASED ON HNS ACQUIRED CAPITAL (1.8M VSAT) |
| | SUBTOTAL NRC | $0 | $0 | $0 | | | |
| | UNIT DESCRIPTION | | UNITS | COST/UNIT | | TYPE $ | COMMENTS |
| | MAINTENANCE | | 0 | $0 | | RC | |
| | TOTAL RECURRING | | | $0 | | | |
| | | OLD | NEW | $ PER | $ PER | TOTAL | |
| | UNIT DESCRIPTION | OLD UNITS | NEW UNITS | OLD UNIT | NEW UNIT | COST | COMMENTS |
| N. | • HNS DATA BROADCAST OPTION | 0 | 0 | | $0 | $0 | |
| | EDIU INSTALLATION | | | $0 | $0 | $0 | EXTENDED DATA INTERFACE UNIT, EXPANSION TO 15 DATA PORT CARDS |
| | | | | | | | PORTS (TYPE II VSAT); 5-15 DATA PORTS (TYPE I) |
| | SUBTOTAL CAPITAL | | | | | | CALCULATED ON DISTANCE FROM A SERVICE CENTER, ONLY APPLIES IF |
| | | | | $0 | $0 | $0 | INSTALLED AFTER VSAT INSTALL |
| | | OLD | NEW | COST PER | | | |
| | UNIT DESCRIPTION | OLD UNITS | NEW UNITS | UNIT | | TYPE $ | COMMENTS |
| | HNS PROJ. MGM'T FEE | 0 | 0 | #DIV/0! | | NRC | |
| | SUBTOTAL NRC | $0 | $0 | $0 | | | |
| | UNIT DESCRIPTION | | UNITS | COST/UNIT | | TYPE $ | COMMENTS |
| | MAINTENANCE | | 0 | $0.00 | | RC | |
| | TOTAL RECURRING | | | $0 | | | |
| | | OLD | NEW | $ PER | $ PER | TOTAL | |
| | UNIT DESCRIPTION | OLD UNITS | NEW UNITS | OLD UNIT | NEW UNIT | COST | COMMENTS |
| | • TURBO PORT CARD | 0 | 0 | $0 | $0 | $0 | |
| | • PORT INSTALLATION | | | | | | |
| | | | | | | | ADDITIONAL RPDC's |
| | | | | | | | CALCULATED ON DISTANCE FROM A SERVICE CENTER, ONLY APPLIES IF |
| | SUBTOTAL CAPITAL | | | $0 | $0 | $0 | IF INSTALLED AFTER VSAT INSTALL |
| | | OLD | NEW | COST PER | | | |
| | UNIT DESCRIPTION | OLD UNITS | NEW UNITS | UNIT | | TYPE $ | COMMENTS |
| | HNS PROJ. MGM'T FEE | 0 | 0 | #DIV/0! | | NRC | HNS 4% MGM'T FEE BASED ON HNS ACQUIRED CAPITAL (1.8M VSAT) |
| | SUBTOTAL NRC | $0 | $0 | $0 | | | |
| | UNIT DESCRIPTION | | UNITS | COST/UNIT | | TYPE $ | COMMENTS |
| | INCREM. PORT MAINTENANCE | | 0 | $0.00 | | RC | 8AM-5PM, INCREM. PORT MAINTENANCE |
| | TOTAL RECURRING | | | $0 | | | |

VSATpricing98c.xls

30

| | | | | | | | |
|---|---|---|---|---|---|---|---|
| | | OLD | NEW | $ PER | $ PER | TOTAL | |
| | UNIT DESCRIPTION | OLD UNITS | NEW UNITS | OLD UNIT | NEW UNIT | COST | COMMENTS |
| P. | • INCR. 2-PORTS, MPC (4) | 0 | 0 | $0 | $0 | $0 | |
| | • PORT INSTALLATION | | | $0 | $0 | $0 | |
| | | | | | | | 2 PORT MODULE INCREMENT, TOTAL 4 PORT MPC |
| | | | | | | | CALCULATED ON DISTANCE FROM A SERVICE CENTER, ONLY APPLIES IF |
| | SUBTOTAL CAPITAL | | | $0 | $0 | $0 | IF INSTALLED AFTER VSAT INSTALL |
| | | OLD | NEW | COST PER | | | |
| | UNIT DESCRIPTION | OLD UNITS | NEW UNITS | UNIT | | TYPE $ | COMMENTS |
| | HNS PROJ. MGM'T FEE | 0 | 0 | #DIV/0! | | NRC | HNS 4% MGM'T FEE BASED ON HNS ACQUIRED CAPITAL (1.8M VSAT) |
| | SUBTOTAL NRC | $0 | $0 | $0 | | | |
| | UNIT DESCRIPTION | | UNITS | COST/UNIT | | TYPE $ | COMMENTS |
| | INCREM. PORT MAINTENANCE | | 0 | $0 | | RC | 8AM-5PM, INCREM. PORT MAINTENANCE |
| | TOTAL RECURRING | | | $0 | | | |
| | | OLD | NEW | $ PER | $ PER | TOTAL | |
| | UNIT DESCRIPTION | OLD UNITS | NEW UNITS | OLD UNIT | NEW UNIT | COST | COMMENTS |
| Q. | • INCR. 2-PORTS, MPC (6) | 0 | 0 | $0 | $0 | $0 | |
| | • PORT INSTALLATION | | | $0 | $0 | $0 | 2 PORT MODULE INCREMENT, TOTAL 6 PORT MPC |
| | | | | | | | CALCULATED ON DISTANCE FROM A SERVICE CENTER, ONLY APPLIES IF |
| | | | | | | | IF INSTALLED AFTER VSAT INSTALL |
| | SUBTOTAL CAPITAL | | | $0 | $0 | $0 | |
| | | OLD | NEW | COST PER | | | |
| | UNIT DESCRIPTION | OLD UNITS | NEW UNITS | UNIT | | TYPE $ | COMMENTS |
| | HNS PROJ. MGM'T FEE | 0 | 0 | #DIV/0! | | NRC | HNS 4% MGM'T FEE BASED ON HNS ACQUIRED CAPITAL (1.8M VSAT) |
| | SUBTOTAL NRC | $0 | $0 | $0 | | | |
| | UNIT DESCRIPTION | | UNITS | COST/UNIT | | TYPE $ | COMMENTS |
| | INCREM. PORT MAINTENANCE | | 0 | $0 | | RC | 8AM-5PM, INCREM. PORT MAINTENANCE |
| | TOTAL RECURRING | | | $0 | | | |
| | | OLD | NEW | $ PER | $ PER | TOTAL | |
| | UNIT DESCRIPTION | OLD UNITS | NEW UNITS | OLD UNIT | NEW UNIT | COST | COMMENTS |
| R. | • INCR. 2-PORTS, MPC (8) | 0 | 0 | $0 | $0 | $0 | |
| | • PORT INSTALLATION | | | $0 | $0 | $0 | 2 PORT MODULE INCREMENT, TOTAL 6 PORT MPC |
| | | | | | | | CALCULATED ON DISTANCE FROM A SERVICE CENTER, ONLY APPLIES IF |
| | | | | | | | IF INSTALLED AFTER VSAT INSTALL |
| | SUBTOTAL CAPITAL | | | $0 | $0 | $0 | |
| | | OLD | NEW | COST PER | | | |
| | UNIT DESCRIPTION | OLD UNITS | NEW UNITS | UNIT | | TYPE $ | COMMENTS |
| | HNS PROJ. MGM'T FEE | 0 | 0 | #DIV/0! | | NRC | HNS 4% MGM'T FEE BASED ON HNS ACQUIRED CAPITAL (1.8M VSAT) |
| | SUBTOTAL NRC | $0 | $0 | $0 | | | |
| | | | | TOTAL | | | |
| | UNIT DESCRIPTION | | UNITS | COST | | TYPE $ | COMMENTS |
| | INCREM. PORT MAINTENANCE | | 0 | $0 | | RC | 8AM-5PM, INCREM. PORT MAINTENANCE |
| | TOTAL RECURRING | | | $0 | | | |
| | | | UNIT | TOTAL | | | |
| | UNIT DESCRIPTION | UNITS | COST | COST | | TYPE $ | COMMENTS |
| S. | • 24HR VSAT MAINT. | 0 | $0.00 | $0 | | | |
| | | | | | | | INCREM. COST/MO TO INCREASE COVERAGE FROM 8AM-5PM STANDARD |
| | TOTAL RECURRING | | $0 | $0 | | | MAINT. TO 24HR MAINT. COVERAGE ($49=>$67) |

VSATpricing98c xls

31

| | UNIT DESCRIPTION | UNITS | UNIT COST | TOTAL COST | TYPE $ | COMMENTS |
|---|---|---|---|---|---|---|
| 5. | • 24HR RDPC MAINT. | 0 | 0 | $0 | | INCREM. COST/MO TO INCREASE COVERAGE FROM 8AM-5PM STANDARD MAINT. TO 24HR MAINT. COVERAGE |
| | TOTAL RECURRING | | $0 | $0 | | |

| | | | |
|---|---|---|---|
| TOT VSAT CAPITAL | $0 | $0 | $0 |
| TOT VSAT NRC | $0 | $0 | $0 |
| TOT VSAT LEASE | | | $0 |
| TOT VSAT RECURRING | | | $0 |

| | | |
|---|---|---|
| 2. | **SHARED HUB USAGE** | |
| | • PRIVATE HUB | 0 |
| | • AUB. HUB - NEW EQ. | 0 |
| | • AUB. HUB - OLD EQ. | 0 |
| | • DAY. HUB - NEW EQ. | 0 |
| | • DAY. HUB - OLD EQ. | 0 |
| | • SHARED RESOURCE | 100.00% |
| | • HNS SOFTWARE LICENSE(S) | 0 |

| | UNIT DESCRIPTION | DAYTON HUB COST/UNIT | PRIVATE HUB COST/UNIT | PRIVATE HUB TOTAL COST | DAYTON HUB TOTAL COST | TYPE $ | COMMENTS |
|---|---|---|---|---|---|---|---|
| A. | • SHARED HUB COMPONENTS | | | | | | |
| | - 7.1M ANT & RF SYS | $0 | $0 | $0 | $0 | CAP | |
| | - 200 W 1 X 1 HPA UPGRADE | $0 | $0 | $0 | $0 | CAP | |
| | - SYS CONTRL COMP | $0 | $0 | $0 | $0 | CAP | |
| | - HNS HUB SERVER (DATA BROADCAST) | $0 | $0 | $0 | $0 | CAP | |
| | - STARBURST HUB SERVER (DATA BROADCAS | $0 | $0 | $0 | $0 | CAP | |
| | - NMC CONSOLES | $0 | $0 | $0 | $0 | CAP | |
| | - ILLUMINET LICENSE | $0 | $0 | $0 | $0 | CAP | |
| | - HUB SITE PREP | $0 | $0 | $0 | $0 | CAP | |
| | - ANTENNA SUBSYSTEM SPARES | $0 | $0 | $0 | $0 | CAP | |
| | - HUB SPARES | $0 | $0 | $0 | $0 | CAP | |
| | - TEST EQUIPMENT | $0 | $0 | $0 | $0 | CAP | |
| | - NETWORK FCC LIC | $0 | $0 | $0 | $0 | CAP | |
| | - STEP TRACK UPGRADE | $0 | $0 | $0 | $0 | CAP | |
| | - SOFTWARE LICENSE FEE | $0 | $0 | $0 | $0 | CAP | |
| | SUBTOTAL CAPITAL | | | $0 | $0 | | |
| | TOTAL ALLOCATED CAPITAL | | | $0 | $0 | | |

| UNIT DESCRIPTION | DAYTON HUB COST/UNIT | PRIVATE HUB COST/UNIT | PRIVATE HUB TOTAL COST | DAYTON HUB TOTAL COST | TYPE $ | COMMENTS |
|---|---|---|---|---|---|---|
| - PLANO VSAT INSTALLATION | $0 | $0 | $0 | $0 | NRC | ALLOCATION BASED ON NETWORK RESOURCE PERCENTAGE |
| - STARBURST SOFTWARE LICENSE | $0 | $0 | $0 | $0 | NRC | |
| - TRAINING | $0 | $0 | $0 | $0 | NRC | 15 PEOPLE FOR 30 DAYS HNS TRAINING |
| 0 | | | $0.00 | $0 | NRC | 4% HNS PROJ. MGM'T ON ACQUIRED CAPITAL EQUIPMENT |
| SUBTOTAL NRC | | | $0 | $0 | | |
| TOTAL ALLOCATED NRC | | | $0 | $0 | | |

| UNIT DESCRIPTION | DAYTON HUB COST/UNIT | PRIVATE HUB COST/UNIT | PRIVATE HUB TOTAL COST | DAYTON HUB TOTAL COST | TYPE $ | COMMENTS |
|---|---|---|---|---|---|---|
| - AUBURN => PLANO COMM. LINE | $0 | $0 | $0 | $0 | RC | |
| - VAX #2 MAINTENANCE FEE | $0 | $0 | $0 | $0 | RC | |
| - HUB HARDWARE MAINTENANCE | $0 | $0 | $0 | $0 | RC | |
| - HUB SOFTWARE MAINTENANCE | $0 | $0 | $0 | $0 | RC | |
| - ILLUMINET SOFTWARE MAINTENANCE | $0 | $0 | $0 | $0 | RC | |
| - ILLUMINET CONSOLE MAINTENANCE | $0 | $0 | $0 | $0 | RC | |
| - STARBURST S/W MAINTENANCE | $0 | $0 | $0 | $0 | RC | |
| - RF MAINTENANCE | $0 | $0 | $0 | $0 | RC | |
| - IPC FACILITY SPACE | $0 | $0 | $0 | $0 | RC | |
| SUBTOTAL RECURRING | | | $0 | $0 | | |
| TOTAL ALLOCATED RECURRING | | | $0 | $0 | | |

| | UNIT DESCRIPTION | # OF UNITS | SHARED COST/UNIT | TOTAL COST | TYPE $ | COMMENTS |
|---|---|---|---|---|---|---|
| B. | • HUB SOFTWARE | | $0 | $0.00 | RC | |
| | TOTAL RECURRING EXPENSE | | | $0 | | |

| | |
|---|---|
| TOT SHARED HUB CAPITAL | $0 |
| TOT SHARED HUB NRC | $0 |
| TOT SHARED HUB RECURRING | $0 |

3. DEDICATED HUB EQUIPMENT

| | NEW UNITS | OLD UNITS |
|---|---|---|
| • 56K LIM(s) | 0 | 0 |
| • 19.2K LIM(s) | 0 | 0 |

VSATpricing98c.xls

32

| | | | | | | | |
|---|---|---|---|---|---|---|---|
| | • 9.6K LIM(s) | 0 | 0 | | | | |
| | • LAN 400K SLIM | 0 | 0 | | | | |
| | • LAN EQ. (3 IMs) | 0 | 0 | | | | |
| | • LAN EQ. (2 IMs) | 0 | 0 | | | | |
| | | OLD | NEW | $ PER | $ PER | TOTAL | |
| | UNIT DESCRIPTION | UNITS | UNITS | OLD UNIT | NEW UNIT | COST | COMMENTS |
| A. | • 56K LIM(s) | 0.000% | 0.000% | | | | |
| | - LINE INTERFACE MOD. | | | $0 | $0 | $0 | MAX 1-56K PORT PER LIM - 100% ALLOCATION |
| | - DATA PORT CLUSTER | | | $0 | $0 | $0 | MAX 4-56K LIMs/DPC. ALLOCATION 25% (1/4) |
| | - RED. DPC (1:3) | | | $0 | $0 | $0 | MAX 4-56K LIMs/DPC. 1:3 REDUNDANCY, 8.33% |
| | | | | | | | (1/12) ALLOCATION |
| | - BASEBAND EXP. RACK | | | $0 | $0 | $0 | MAX 24-56K ONLINE LIMs/BBE, 8-56K REDUNDANT |
| | | | | | | | LIMs/BBEs 6.25% ALLOCATION |
| | - CONTIN. CAP. COSTS | | | $0 | $0 | $0 | 3% CONTINGENCY ON ALL HUB CAPITAL |
| | SUBTOTAL CAPITAL | | | $0 | $0 | $0 | |
| | | OLD | NEW | $ PER | $ PER | TOTAL | |
| | UNIT DESCRIPTION | UNITS | UNITS | OLD UNIT | NEW UNIT | COST | COMMENTS |
| | - HNS PROJ. MGM'T FEES | 0.000% | 0.000% | | | #REF! | 4% HNS PROJ. MGM'T ON ACQUIRED CAPITAL EQUIPMENT |
| | SUBTOTAL NRC | $0 | $0 | | | $0 | |
| | | | | | | TOTAL | |
| | UNIT DESCRIPTION | COST/UNIT | | | | COST | COMMENTS |
| | - DPC MAINTENANCE | $0 | | | | $0.00 | MONTHLY RECURRING HUB DPC MAINTENANCE, |
| | | | | | | | ALLOCATION @ 25% |
| | - RED. DPC MAINTENANCE | $0 | | | | $0.00 | MONTHLY RECURRING HUB REDUNDANT DPC MAINTENANCE, |
| | | | | | | | ALLOCATION 8.33% |
| | SUBTOTAL RECURRING | | | | | $0.00 | |
| | | OLD | NEW | $ PER | $ PER | TOTAL | |
| | UNIT DESCRIPTION | UNITS | UNITS | OLD UNIT | NEW UNIT | COST | COMMENTS |
| B. | • 19.2K LIM | 0.000% | 0.000% | | | | |
| | - LINE INTERFACE MODULE | | | $0 | $0 | $0 | MAX 2-19.2K s PER LIM - 50% ALLOCATION |
| | - DATA PORT CLUSTER | | | $0 | $0 | $0 | MAX 8-19.2K LIMs/DPC. ALLOCATION 12.5% |
| | - RED. DATA PORT CLUSTER (1:3) | | | $0 | $0 | $0 | MAX 8-19.2K LIMs/DPC, 1:3 REDUNDANCY, 4.17% |
| | | | | | | | ALLOCATION |
| | - BASEBAND EXPANSION RACK | | | $0 | $0 | $0 | MAX 48-19.2K ONLINE LIMs/BBE, 16-19.2K REDUNDANT |
| | | | | | | | LIMs/BBE, 3.125% ALLOCATION |
| | - CONTINGENCY CAPITAL COSTS | | | $0 | $0 | $0 | 3% CONTINGENCY ON ALL HUB CAPITAL |
| | SUBTOTAL CAPITAL | | | $0 | $0 | $0 | |
| | | OLD | NEW | $ PER | $ PER | TOTAL | |
| | UNIT DESCRIPTION | UNITS | UNITS | OLD UNIT | NEW UNIT | COST | COMMENTS |
| | - HNS PROJECT MGM'T FEES | 0.000% | 0.000% | | | #REF! | 4% HNS PROJ. MGM'T ON ACQUIRED CAPITAL EQUIPMENT |
| | SUBTOTAL NRC | $0 | $0 | | | $0 | |
| | | | | | | TOTAL | |
| | UNIT DESCRIPTION | COST/UNIT | | | | COST | COMMENTS |
| | - DPC MAINTENANCE | $0 | | | | $0 | MONTHLY RECURRING HUB DPC MAINTENANCE, ALLOCATION |
| | | | | | | | @ 12.5% |
| | - RED. DPC MAINTENANCE | $0 | | | | $0 | MONTHLY RECURRING HUB REDUNDANT DPC MAINTENANCE, |
| | | | | | | | ALLOCATION 4.17% |
| | SUBTOTAL RECURRING | | | | | $0 | |

VSATpricing98c.xls

33

| | UNIT DESCRIPTION | OLD UNITS | NEW UNITS | $ PER OLD UNIT | $ PER NEW UNIT | TOTAL COST | COMMENTS |
|---|---|---|---|---|---|---|---|
| C. | • 9.6K LIM | 0.000% | 0.000% | | | | |
| | - LINE INTERFACE MODULE | | | $0 | $0 | $0 | MAX 4-9.6K's PER LIM - 25% ALLOCATION |
| | - DATA PORT CLUSTER | | | $0 | $0 | $0 | MAX 16-9.6K LIMs/DPC. ALLOCATION 6.25% |
| | - RED. DATA PORT CLUSTER (1:3) | | | $0 | $0 | $0 | MAX 16-9.6K LIMs/DPC. 1:3 REDUNDANCY. 2.08% ALLOCATION |
| | - BASEBAND EXPANSION RACK | | | $0 | $0 | $0 | MAX 96-9.6K ONLINE LIMs/BBE. 32-9.6K REDUNDANT LIMs/BBE. 1.56% ALLOCATION PER 9.6KBPS PORT |
| | - CONTINGENCY CAPITAL COSTS | | | $0 | $0 | $0 | |
| | SUBTOTAL CAPITAL | | | $0 | $0 | $0 | |

| | UNIT DESCRIPTION | OLD UNITS | NEW UNITS | $ PER OLD UNIT | $ PER NEW UNIT | TOTAL COST | COMMENTS | |
|---|---|---|---|---|---|---|---|---|
| | - HNS PROJECT MGM'T FEES | 0.000% | 0.000% | | | #REF! | 4% HNS PROJ. MGM'T ON ACQUIRED CAPITAL EQUIPMENT | |
| | SUBTOTAL NRC | $0 | $0 | | | $0 | | $0 |

| | UNIT DESCRIPTION | COST/UNIT | TOTAL COST | COMMENTS |
|---|---|---|---|---|
| | - DPC MAINTENANCE | $0 | $0 | MONTHLY RECURRING HUB DPC MAINTENANCE. ALLOCATION @ 6.25% |
| | - RED. DPC MAINTENANCE | $0 | $0 | MONTHLY RECURRING HUB REDUNDANT DPC MAINTENANCE. ALLOCATION 4.17% |
| | SUBTOTAL RECURRING | | $0 | |

| | UNIT DESCRIPTION | OLD UNITS | NEW UNITS | $ PER OLD UNIT | $ PER NEW UNIT | TOTAL COST | COMMENTS |
|---|---|---|---|---|---|---|---|
| D. | o LAN 400K SLIM | 0.000% | 0.000% | $0 | $0 | $0 | |
| | o LAN EQ. (3 IMs) | 0.000% | 0.000% | $0 | $0 | $0 | MAX 4-56K LIMs/DPC. ALLOCATION 25% (1/4) |
| | o LAN EQ (2 IMs) | 0.000% | 0.000% | $0 | $0 | $0 | MAX 4-56K LIMs/DPC. 1:3 REDUNDANCY. 8.33% (1/12) ALLOCATION |
| | - BASEBAND EXP. RACK | | | $0 | $0 | $0 | MAX 24-56K ONLINE LIMs/BBE. 8-56K REDUNDANT LIMs/BBEs 6.25% ALLOCATION |
| | - CONTINGENCY CAPITAL COSTS | | | $0 | $0 | $0.00 | 6% CONTINGENCY ON ALL HUB CAPITAL |
| | SUBTOTAL CAPITAL | | | | | $0 | |

| | UNIT DESCRIPTION | OLD UNITS | NEW UNITS | $ PER OLD UNIT | $ PER NEW UNIT | TOTAL COST | COMMENTS |
|---|---|---|---|---|---|---|---|
| | - HNS PROJ. MGM'T FEES | 0.000% | 0.000% | | | $0 | 4% HNS PROJ. MGM'T ON ACQUIRED CAPITAL EQUIPMENT |
| | SUBTOTAL NRC | | | $0 | $0 | $0 | |

| | UNIT DESCRIPTION | COST/UNIT | TOTAL COST | COMMENTS |
|---|---|---|---|---|
| | - DPC MAINTENANCE | $0 | $0.00 | |
| | SUBTOTAL RECURRING | $0.00 | $0.00 | |

| | | | | | |
|---|---|---|---|---|---|
| | TOT HUB EQUIP CAPITAL | | $0 | $0 | $0 |
| | TOT HUB EQUIP NRC | | $0 | $0 | $0 |
| | TOT HUB EQUIP RECURRING | | | | $0 |

4. DEDICATED SPACE SEGMENT EQUIPMENT & USAGE

• DEDICATED BANDWIDTH

- INRTE: COST IS BASED ON ACCESS METHOD AND PERCENTAGE INROUTE REQUIRED

- OUTRTE: COST IS BASED ON PERCENTAGE OF THE OUTROUTE REQUIRED

| | NEW UNITS | OLD UNITS |
|---|---|---|
| • 64Kbps IRTE | 0 | 0 |
| • 128Kbps IRTE | 0 | 0 |
| • 128Kbps ORTE | 0 | 0 |
| • 512Kbps ORTE | 0 | 0 |

VSATpricing98c.xls

34

| | | | | | | | |
|---|---|---|---|---|---|---|---|
| | | OLD | NEW | $ PER | $ PER | TOTAL | |
| | UNIT DESCRIPTION | UNITS | UNITS | OLD UNIT | NEW UNIT | COST | COMMENTS |
| A. | • INROUTE CAPITAL | 0 | 0 | $0 | $0 | $0 | |
| | SUBTOTAL CAPITAL | | | $0 | $0 | $0 | |
| | | OLD | NEW | $ PER | $ PER | TOTAL | |
| | UNIT DESCRIPTION | UNITS | UNITS | OLD UNIT | NEW UNIT | COST | COMMENTS |
| | - HNS PROJECT MGM'T FEES | 0 | 0 | | | $0 | 4% HNS PROJ. MGM'T ON ACQUIRED CAPITAL EQUIP |
| | SUBTOTAL NRC | | | $0 | $0 | $0 | |
| | | | | | | TOTAL | |
| | UNIT DESCRIPTION | | COST/UNIT | | | COST | COMMENTS |
| | - 64KBPS INRTE SPACE SEGMENT | | $0 | | | $0 | MONTLHLY RECURRING SPACE SEGMENT COSTS PER .4 |
| | - 64KBPS INROUTE MAINTENANCE | | $0 | | | $0 | OF 1% @ $2500/ % |
| | - 128KBPS INROUTE SPACE SEGMENT | | $0 | | | #N/A | |
| | - 128KBPS INRTE MAINTENANCE | | $0 | | | $0 | MONTHLY RECURRING INROUTE MAINT. COSTS |
| | SUBTOTAL RECURRING | | | | | #N/A | |
| | | OLD | NEW | $ PER | $ PER | TOTAL | |
| | UNIT DESCRIPTION | UNITS | UNITS | OLD UNIT | NEW UNIT | COST | COMMENTS |
| B. | • OUTROUTE CAPITAL | 0 | 0 | $0 | $0 | $0 | |
| | SUBTOTAL CAPITAL | $0 | $0 | | | $0 | |
| | | OLD | NEW | $ PER | $ PER | TOTAL | |
| | UNIT DESCRIPTION | UNITS | UNITS | OLD UNIT | NEW UNIT | COST | COMMENTS |
| | - HNS PROJECT MGM'T FEES | 0 | 0 | | | $0 | 4% HNS PROJ. MGM'T ON ACQUIRED CAPITAL EQUIP |
| | SUBTOTAL NRC | | | $0 | $0 | $0 | |
| | | | TOTAL | TOTAL | CURRENT | INCREM. | |
| | UNIT DESCRIPTION | | % REQ'D | COST | COST | COST | COMMENTS |
| | - INROUTE & OUTROUTE SPACE SEGMENT | | #N/A | #N/A | $0 | #N/A | MO RC SPACE SEGMENT COSTS PER 5.01% @ $2500/1% |
| | | | | | | | MONTHLY RECURRING OUTROUTE MAINT. COSTS |
| | - 512KBPS OUTROUTE MAINTENANCE | | | $0 | | $0 | |
| | - 128KBPS OUTRTE SPACE SEGMENT | | | $0 | | $0 | |
| | - 128KBPS OUTROUTE MAINTENANCE | | | $0 | | $0 | |
| | SUBTOTAL RECURRING | | | | | #N/A | |
| | TOT USAGE CAPITAL | $0 | $0 | $0 | | | |
| | TOT USAGE NRC | $0 | $0 | $0 | | | |
| | TOT USAGE RECURRING | | | #N/A | | | |

Appendix D

©1998 Electronic Data Systems Corporation

SATELLITE SERVICES COSTING AND PRICING

| | |
|---|---|
| PRODUCT/SVC: | VSAT Service |
| PROD LINE: | EDS*SAT - Satellite Services Product Line |
| PROJ #: | |
| PROJ NAME: | |
| PROJ LOCS: | |

| | |
|---|---|
| DATE: | 09-Sep-98 |
| TIME: | 12:56 PM |

UNIT INPUT WORKSHEET

| 1. VSAT EQUIPMENT | NEW UNITS | OLD UNITS |
|---|---|---|
| A. o .75M/1.0M VSAT(s), PES 6500 | 0 | 0 |
| B. o 1.0/1.2M VSAT(s), PES 5000 | 0 | 0 |
| C. o Leased 1.0/1.2M VSAT(s), PES 5 | 0 | 0 |
| D. o 1.8M VSAT(s), PES 5000 | 0 | 0 |
| E. o 2.4M VSAT(s), PES 6500 | 0 | 0 |
| F. o .75M/1.0M VSAT(s), PES 8000 | 0 | 0 |
| G. o 1.2M VSAT(s), PES 8000 | 0 | 0 |
| H. o 1.8M VSAT(s), PES 8000 | 0 | 0 |
| I. o 2.4M VSAT(s), PES 8000 | 0 | 0 |
| J. o 1.0M ACTIVE DEICING | 0 | 0 |
| K. o 1.2M ACTIVE DEICING | 0 | 0 |
| L. o 1.8M ACTIVE DEICING | 0 | 0 |
| M. o 2.4M ACTIVE DEICING | 0 | 0 |
| N. o 1W/2W - RFH/ODU | 0 | 0 |
| O. o HNS DATA BROADCAST OPTION | 0 | 0 |
| P. o TURBO PORT CARD | 0 | 0 |
| Q. o INCR. 2-PORTS, MPC (4) | 0 | 0 |
| R. o INCR. 2-PORTS, MPC (6) | 0 | 0 |
| S. o INCR. 2-PORTS, MPC (8) | 0 | 0 |
| S. o 24HR VSAT MAINT. | 0 | |
| T. o 24HR RDPC MAINT. | 0 | |
| o MISC | 0 | |
| **IF PRICED BY USER, ENTER #: | | |
| | 0 | |

| 2. SHARED/PRIVATE HUB SERVICES | |
|---|---|
| A. o PRIVATE HUB | 0 |
| o AUB. HUB - NEW EQ. | 0 |
| o AUB. HUB - OLD EQ. | 0 |
| o DAY. HUB - NEW EQ. | 0 |
| o DAY. HUB - OLD EQ. | 0 |
| o SHARED RESOURCE | 100.00% |
| B. o HNS SOFTWARE LICENSE(S | 0.00 |
| o HNS BROADCAST LICENSE | 0.00 |
| o STARBURST BROADCAST I | 0.00 |

| 3. DED. HUB EQIUP. | NEW UNITS | OLD UNITS |
|---|---|---|
| A. o 56K LIM(s) | 0.00 | 0.00 |
| B. o 19.2K LIM(s) | 0.00 | 0.00 |
| C. o 9.6K LIM(s) | 0.00 | 0.00 |
| D. o LAN 400K SLIM | 0.00 | 0.00 |
| E. o LAN EQ. (3 IMs) | 0.00 | 0.00 |
| F. o LAN EQ. (2 IMs) | 0.00 | 0.00 |

| 4. SPC EQ & USAGE | NEW UNITS | OLD UNITS | TOTAL SPCE SEG. UNITS |
|---|---|---|---|
| A o 64Kbps IRTE | 0.00 | 0.00 | |
| B o 128Kbps IRTE | 0.00 | 0.00 | 0.00 |
| C. o 128Kbps ORTE | 0.00 | 0.00 | 0.00 |
| D o 512Kbps ORTE | 0.000 | 0.000 | |

INPUT MODELING PARAMETERS

| | | | |
|---|---|---|---|
| VSAT SALES TAX: | 4.99% | NATIONAL AVERAGE | |
| HUB SALES TAX: | 5.00% | | |
| CAPITAL DEPRECIATION: | 36 | MONTHS | |
| O/H RATE: | 21.00% | | 5 YR. |
| ACCT MARGIN: | 0.00% | | AVG. |
| VSAT PROP. TAX: | NATL | (LIST ST OR NATL) | 1.32% |
| HUB PROP. TAX: | OH | (LIST STATE OF HUB) | 1.08% |
| ADD. NRC EXP.: | $0 | | |
| ADD. NRC REV.: | $0 | | |
| VSAT IMPL. FEE: | $0 | | |
| RC INFL. RATE: | 0.00% | | |
| HUB ALLOCATION: | 100.00% | | |
| PROG. MGMT FEE: | 0.00% | | |
| OLD CAP. DEPREC.: | 0.00% | | |
| ENG. DESIGN HRS.: | 1000 | | |
| PROG. MGMT HRS.: | 0 | | |

| | | | |
|---|---|---|---|
| NRC EXPENSE TITLE: | $0 | | |
| NRC RELIEF | $0.00 | per VSAT, one time | |
| NRC PER VSAT NETWORK: | $0 | #N/A | Safety Margin |
| Monthly RECURRING RELIEF: | $0.00 | 21.0% | O/H RATE |
| COMPETITIVE PRICE: | $0 | VSAT PRICE PER MONTH | |
| AVG NETWORK PRICE: | | AVG NET PRICE PER MO. | |

| | |
|---|---|
| NRC TO ACCT: | $0 |
| MONTHLY RC TO ACCT: | $0.00 |

Appendix E

©1998 Electronic Data Systems Corporation

VSATpricing98b.xls

SPACE SEGMENT UTILIZATION MATRIX

| | | 128KBPS INROUTES | | | | | | | | | | | | | | | | | | |
|---|---|---|---|---|---|---|---|---|---|---|---|---|---|---|---|---|---|---|---|---|
| 5 | | | | | | | | | | | | | | | | | | | | |
| 1 | | 1 | 2 | 3 | 4 | 5 | 6 | 7 | 8 | 9 | 10 | 11 | 12 | 13 | 14 | 15 | 16 | 17 | 18 | 19 |
| 2 | 1 | 6.00 | 6.00 | 6.00 | 7.00 | 7.00 | 8.00 | 9.00 | 9.00 | 10.00 | 16.00 | 12.00 | 12.00 | 13.00 | 14.00 | 22.00 | 15.00 | 16.00 | 17.00 | 18.00 |
| K | 2 | 11.00 | 11.00 | 11.00 | 12.00 | 12.00 | 12.00 | 13.00 | 13.00 | 13.00 | 14.00 | 15.00 | 15.00 | 16.00 | 17.00 | 18.00 | 18.00 | 19.00 | 20.00 | 20.00 |
| | 3 | 16.00 | 16.00 | 16.00 | 17.00 | 17.00 | 17.00 | 18.00 | 18.00 | 18.00 | 19.00 | 19.00 | 19.00 | 20.00 | 20.00 | 20.00 | 21.00 | 22.00 | 23.00 | 23.00 |
| O | 4 | 20.36 | 20.68 | 21.00 | 21.32 | 21.64 | 21.96 | 22.28 | 22.60 | 22.92 | 23.24 | 23.56 | 23.88 | 24.20 | 24.52 | 24.84 | 25.16 | 25.48 | 25.80 | 27.00 |
| U | 5 | 25.37 | 25.69 | 26.01 | 26.33 | 26.65 | 26.97 | 27.29 | 27.61 | 27.93 | 28.25 | 28.57 | 28.89 | 29.21 | 29.53 | 29.85 | 30.17 | 30.49 | 30.81 | 31.13 |
| T | 6 | 30.38 | 30.70 | 31.02 | 31.34 | 31.66 | 31.98 | 32.30 | 32.62 | 32.94 | 33.26 | 33.58 | 33.90 | 34.22 | 34.54 | 34.86 | 35.18 | 35.50 | 35.82 | 36.14 |
| R | 7 | 35.39 | 35.71 | 36.03 | 36.35 | 36.67 | 36.99 | 37.31 | 37.63 | 37.95 | 38.27 | 38.59 | 38.91 | 39.23 | 39.55 | 39.87 | 40.19 | 40.51 | 40.83 | 41.15 |
| O | 8 | 40.40 | 40.72 | 41.04 | 41.36 | 41.68 | 42.00 | 42.32 | 42.64 | 42.96 | 43.28 | 43.60 | 43.92 | 44.24 | 44.56 | 44.88 | 45.20 | 45.52 | 45.84 | 46.16 |
| U | 9 | 45.41 | 45.73 | 46.05 | 46.37 | 46.69 | 47.01 | 47.33 | 47.65 | 47.97 | 48.29 | 48.61 | 48.93 | 49.25 | 49.57 | 49.89 | 50.21 | 50.53 | 50.85 | 51.17 |
| T | 10 | 50.42 | 50.74 | 51.06 | 51.38 | 51.70 | 52.02 | 52.34 | 52.66 | 52.98 | 53.30 | 53.62 | 53.94 | 54.26 | 54.58 | 54.90 | 55.22 | 55.54 | 55.86 | 56.18 |
| E | 11 | 55.43 | 55.75 | 56.07 | 56.39 | 56.71 | 57.03 | 57.35 | 57.67 | 57.99 | 58.31 | 58.63 | 58.95 | 59.27 | 59.59 | 59.91 | 60.23 | 60.55 | 60.87 | 61.19 |
| S | 12 | 60.44 | 60.76 | 61.08 | 61.40 | 61.72 | 62.04 | 62.36 | 62.68 | 63.00 | 63.32 | 63.64 | 63.96 | 64.28 | 64.60 | 64.92 | 65.24 | 65.56 | 65.88 | 66.20 |
| | 13 | 65.45 | 65.77 | 66.09 | 66.41 | 66.73 | 67.05 | 67.37 | 67.69 | 68.01 | 68.33 | 68.65 | 68.97 | 69.29 | 69.61 | 69.93 | 70.25 | 70.57 | 70.89 | 71.21 |
| | 14 | 70.46 | 70.78 | 71.10 | 71.42 | 71.74 | 72.06 | 72.38 | 72.70 | 73.02 | 73.34 | 73.66 | 73.98 | 74.30 | 74.62 | 74.94 | 75.26 | 75.58 | 75.90 | 76.22 |

Appendix F

1998 Electronic Data Systems Corporation

SALES/PROPERTY TAX ALGORITHM

| | | YEARLY FACTORS | | | | | AVERAGE | ASSESS | TAX | | | | | | | SALES |
|---|---|---|---|---|---|---|---|---|---|---|---|---|---|---|---|---|
| | STATE | YEAR 1 | YEAR 2 | YEAR 3 | YEAR 4 | YEAR 5 | 5 YEAR | RATIO | RATE | YEAR1 | YEAR 2 | YEAR 3 | YEAR 4 | YEAR 5 | 5YR AVG | TAX |
| 1 | AL | 0.9600 | 0.9384 | 0.8736 | 0.8360 | 0.7705 | 0.8757 | 0.2000 | 0.0515 | 0.0099 | 0.0097 | 0.0090 | 0.0086 | 0.0079 | 0.0090 | 4.00% |
| 2 | AK | | | | | | | | | | | | | | | |
| 3 | AZ | | | | | | | | | | | | | | | |
| 4 | AR | | | | | | | | | | | | | | | |
| 5 | CA | | | | | | | | | | | | | | | |
| 6 | CO | | | | | | | | | | | | | | | |
| 7 | CT | | | | | | | | | | | | | | | |
| 8 | DC | | | | | | | | | | | | | | | |
| 9 | DE | | | | | | | | | | | | | | | |
| 10 | FL | | | | | | | | | | | | | | | |
| 11 | GA | | | | | | | | | | | | | | | |
| 12 | HI | | | | | | | | | | | | | | | |
| 13 | ID | | | | | | | | | | | | | | | |
| 14 | IL | | | | | | | | | | | | | | | |
| 15 | IN | | | | | | | | | | | | | | | |
| 16 | IO | | | | | | | | | | | | | | | |
| 17 | KS | | | | | | | | | | | | | | | |
| 18 | KY | | | | | | | | | | | | | | | |
| 19 | LA | | | | | | | | | | | | | | | |
| 20 | ME | | | | | | | | | | | | | | | |
| 21 | MD | | | | | | | | | | | | | | | |
| 22 | MA | | | | | | | | | | | | | | | |
| 23 | MI | | | | | | | | | | | | | | | |
| 24 | MN | | | | | | | | | | | | | | | |
| 25 | MS | | | | | | | | | | | | | | | |
| 26 | MO | | | | | | | | | | | | | | | |
| 27 | MT | | | | | | | | | | | | | | | |
| 28 | NE | | | | | | | | | | | | | | | |
| 29 | NV | | | | | | | | | | | | | | | |
| 30 | NH | | | | | | | | | | | | | | | |
| 31 | NJ | | | | | | | | | | | | | | | |
| 32 | NM | | | | | | | | | | | | | | | |
| 33 | NY | | | | | | | | | | | | | | | |
| 34 | NC | | | | | | | | | | | | | | | |
| . | | | | | | | | | | | | | | | | |
| . | | | | | | | | | | | | | | | | |
| . | | | | | | | | | | | | | | | | |
| 50 | WY | | | | | | | | | | | | | | | |
| | NATL | | | | | | | | | | | | | | | |

Appendix G

1998 Electronic Data Systems Corporatio

VSATpricing98c.xls

38

EDS*SAT - SATELLITE SERVICES PRODUCT LINE

TSG COST CONTROLS SPREADSHEET

DATE: 09-Sep-98

TIME: 12:56 PM

| | | 1995 YEAR 1 | 1996 YEAR 2 | 1997 YEAR 3 | 1998 YEAR 4 | 1999 YEAR 5 | TOTAL |
|---|---|---|---|---|---|---|---|
| **CAPITAL EXPENDITURES** | | | | | | | |
| Stand. Inst. VSATs w Opts (NEW) | | $0 | $0 | $0 | $0 | $0 | $0 |
| Sales Tax @ | 4.99% | $0 | $0 | $0 | $0 | $0 | $0 |
| Stand. Inst. VSATs w Opts (OLD) | | $0 | $0 | $0 | $0 | $0 | $0 |
| Sales Tax @ | 4.99% | $0 | $0 | $0 | $0 | $0 | $0 |
| VSAT Hub | | $0 | $0 | $0 | $0 | $0 | $0 |
| Sales Tax @ | 5.00% | $0 | $0 | $0 | $0 | $0 | $0 |
| Dedicated Hub Equipment (NEW) | | $0 | $0 | $0 | $0 | $0 | $0 |
| Sales Tax @ | 5.00% | $0 | $0 | $0 | $0 | $0 | $0 |
| Dedicated Hub Equipment (OLD) | | $0 | $0 | $0 | $0 | $0 | $0 |
| Sales Tax @ | 5.00% | $0 | $0 | $0 | $0 | $0 | $0 |
| Space Segment Electronics (NEW) | | $0 | $0 | $0 | $0 | $0 | $0 |
| Sales Tax @ | 5.00% | $0 | $0 | $0 | $0 | $0 | $0 |
| Space Segment Electronics (OLD) | | $0 | $0 | $0 | $0 | $0 | $0 |
| Sales Tax @ | 5.00% | $0 | $0 | $0 | $0 | $0 | $0 |
| **CAPITAL EXPEDITURES** | | $0 | $0 | $0 | $0 | $0 | $0 |
| Total Sales Tax @ | | $0 | $0 | $0 | $0 | $0 | $0 |
| **TOTAL CAPITAL EXPEDITURES** | | $0 | $0 | $0 | $0 | $0 | $0 |
| **RELIEF** | | | | | | | |
| **BILLED RELIEF** | | $0 | $0 | $0 | $0 | $0 | $0 |
| **NON-RECURRING RELIEF** | | $0 | $0 | $0 | $0 | $0 | $0 |
| **LESS MARGIN** | 0.00% | $0 | $0 | $0 | $0 | $0 | $0 |
| **TS REVENUE** | | $0 | $0 | $0 | $0 | $0 | $0 |
| **DIRECT OPERATING EXPENSES** | | | | | | | |
| **NON-RECURRING EXPENSES** | | | | | | | |
| | | $0 | $0 | $0 | $0 | $0 | $0 |
| Sales Tax @ | 5.00% | $0 | | | | | |
| Property Taxes (5 yr avg.) | NAT'L | $0 | | | | | |
| **TOTAL NRC EXPENSES** | | $0 | $0 | $0 | $0 | $0 | $0 |
| **RECURRING EXPENSES** | | | | | | | |
| Depreciation - VSATs/Opts | | $0 | $0 | $0 | $0 | $0 | $0 |
| Leased VSAT Equipment (Data) | | $0 | $0 | $0 | $0 | $0 | $0 |
| Leased VSAT Equipment (Video) | | $0 | $0 | $0 | $0 | $0 | $0 |
| Maintenance - VSAT | | $0 | $0 | $0 | $0 | $0 | $0 |
| HNS Maint. Inflation | 0.00% | $0 | $0 | $0 | $0 | $0 | $0 |
| Deprec. - Shared/Private Hub Equip. | | $0 | $0 | $0 | $0 | $0 | $0 |
| Shared/Private Hub Services | | $0 | $0 | $0 | $0 | $0 | $0 |
| Shared/Private Hub Maintenance | | $0 | $0 | $0 | $0 | $0 | $0 |
| HNS Maint. Inflation | 0.00% | $0 | $0 | $0 | $0 | $0 | $0 |
| Depreciation - Dedicated Hub Eq. | | $0 | $0 | $0 | $0 | $0 | $0 |
| Dedicated Hub Equip. Maint. | | $0 | $0 | $0 | $0 | $0 | $0 |
| HNS Maint. Inflation | 0.00% | $0 | $0 | $0 | $0 | $0 | $0 |
| Deprec. - Space Segment Eq. | | $0 | $0 | $0 | $0 | $0 | $0 |
| Sp. Seg. Equip. - Usage | | #N/A | #N/A | #N/A | $0 | $0 | #N/A |
| Sp. Seg. Equip. - Maintenance | | $0 | $0 | $0 | $0 | $0 | $0 |
| HNS Maint. Inflation | 0.00% | $0 | $0 | $0 | $0 | $0 | $0 |
| Total Depreciation / Lease (VSATs) | | $0 | $0 | $0 | $0 | $0 | $0 |
| Total Depreciation (Hub) | | $0 | $0 | $0 | $0 | $0 | $0 |
| Shared Hub Services | | $0 | $0 | $0 | $0 | $0 | $0 |
| Sp. Seg. Equip. - Usage | | #N/A | #N/A | #N/A | $0 | $0 | #N/A |
| Total Recurring - Maint. | | $0 | $0 | $0 | $0 | $0 | $0 |
| Total Maintenance Inflation | | $0 | $0 | $0 | $0 | $0 | $0 |
| Property Taxes (VSATs) | NAT'L | $0 | $0 | $0 | $0 | $0 | $0 |
| Property Taxes (Hub) | OH | $0 | $0 | $0 | $0 | $0 | $0 |
| **TOTAL RECURRING** | | #N/A | #N/A | #N/A | $0 | $0 | #N/A |
| **TOTAL DIRECT EXPENSES** | | #N/A | #N/A | #N/A | $0 | $0 | #N/A |
| **SHARED/INDIRECT ALLOCATIONS** | 21.0% | #N/A | #N/A | #N/A | $0 | $0 | #N/A |
| **VSAT IMPLEMENTATION** | 0 | $0 | $0 | $0 | $0 | $0 | $0 |
| **NON-VSAT IMPLEMENTATION** | | $0 | $0 | $0 | $0 | $0 | $0 |
| **ENG. DESIGN HRS @ $57/HR** | | $57,000 | $0 | $0 | $0 | $0 | $57,000 |
| **PROJECT MGMT @ $7125/HR** | | $0 | $0 | $0 | $0 | $0 | $0 |
| **TOTAL OPERATING EXPENSES** | | #N/A | #N/A | #N/A | $0 | $0 | #N/A |
| **CONTINGENCY FACTOR** | | $0 | $0 | $0 | $0 | $0 | $0 |
| **G/L RELIEF** | | $0 | $0 | $0 | $0 | $0 | $0 |
| **NET** | | #N/A | #N/A | #N/A | $0 | $0 | #N/A |
| **NET %** | | #N/A | #N/A | #N/A | #DIV/0! | #DIV/0! | #N/A |

VSATpricing98c xls
39
| | Total Cost |
|---|---|
| VSAT Components | $6,910.42 |
| Shared/Private Hub Components | $204.41 |
| Dedicated Hub Components | $943.18 |
| Space Segment Components | $1,944.22 |
| Indirect Allocations | #N/A |
| Engineering & Implementation | #DIV/0! |
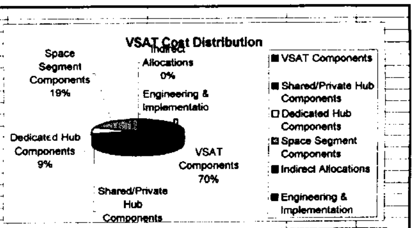
| | Total Cost |
|---|---|
| VSAT Components | #DIV/0! |
| Shared/Private Hub Components | #DIV/0! |
| Dedicated Hub Components | #DIV/0! |
| Space Segment Components | #N/A |
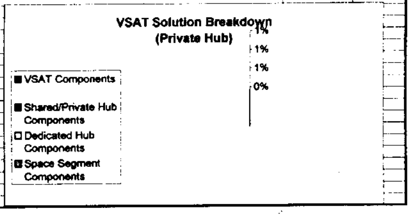

Appendix H
©1998 Electronic Data Systems Corporati

VSATpricing98c.xls
40

COMPETITIVE ANALYSIS WORKSHEET

| | | | | | |
|---|---|---|---|---|---|
| PRODUCT/SVC: | VSAT Service | | | | |
| PROD LINE: | EDS*SAT - Satellite Services Product Line | | | | |
| PROJ #: | | | | | |
| PROJ NAME: | | | | | |
| PROJ LOCS: | | | | | |
| | COMPETITOR MONTHLY RECURRING | EDS MONTHLY RECURRING | | | |
| SERVICE DESCRIPTION | | | | VAR | COMMENTS |
| VSATs W/ INSTALLATION | $0 | $0 | | #DIV/0! | |
| HNS PROGRAM MGMT | $0 | $0 | | #DIV/0! | |
| SALES TAXES | $0 | $0 | | #DIV/0! | |
| PROPERTY TAX | $0 | $0 | | #DIV/0! | |
| SUBTOTAL VSAT EQUIP. | $0 | $0 | | #DIV/0! | |
| VSAT MAINTENANCE | $0 | $0 | | #DIV/0! | |
| MAINTENANCE INFLATION | $0 | $0 | | #DIV/0! | |
| SHARED HUB EQUIPMENT | $0 | $0 | | #DIV/0! | |
| SHARED HUB SVCS & MAINT. | $0 | $0 | | #DIV/0! | |
| DEDICATED HUB EQUIPMENT | $0 | $0 | | #DIV/0! | |
| DEDICATED HUB MAINT. | $0 | $0 | | #DIV/0! | |
| SPACE SEGMENT USAGE | $0 | $0 | | #DIV/0! | |
| TERRESTRIAL BACKHAUL | $0 | $0 | | #DIV/0! | |
| HUB PROPERTY TAXES | $0 | $0 | | #DIV/0! | |
| VSAT IMPLEMENTATION | $0 | $0 | | #DIV/0! | |
| TERRESTRIAL BACKHAUL | $0 | $0 | | #DIV/0! | |
| ON-SITE OPERATIONS SUPPORT | $0 | $0 | | #DIV/0! | |
| REMOTE NETWORK MONITORING | $0 | $0 | | #DIV/0! | |
| SHARED ALLOCATIONS | $0 | $0 | | #DIV/0! | |
| MISC/UNIDENTIFIED | $0 | $0 | | #DIV/0! | |
| NONRECURRING RELIEF | $0 | $0 | | #DIV/0! | |
| TOTAL MONTHLY | $0 | $0 | | #DIV/0! | |
| MONTHLY PER VSAT | #DIV/0! | #DIV/0! | | #DIV/0! | |

Appendix I

)98 Electronic Data Systems Corporation

Service Level Agreement

41

VSAT.DOC

UPDATED February 3, 1995

Service Level Agreement

Memorandum

To: Account Manager/ACCOUNT NAME

From:

Date: Current date, 1995

Subject: Product Line Proposal # J4xxxx

We are pleased to offer the following proposal in response to your request for service. This document will define the costs, terms, and conditions so that there is a clear understanding between our respective EDS organizations. Since Technical Services Your approval of this agreement will serve as authorization as required by EDS procurement guidelines. This is not intended to be a legal document, but rather a general agreement to assist both current and future participants understand the agreed-upon guidelines.

Description of the Offered Services:

USE IF SLA

TECHNICAL SERVICES (TS) will provide services for the Account as detailed in the engineering "Design Proposal Package", submitted separately, and available from your Account Service Representative (ASR).

USE IF IMPLEMENTATION AUTHORIZED

TECHNICAL SERVICES (TS) completed the agreed upon service for the Account at (Account address) on (Date).

EDS*SAT Service Levels

The VSAT Satellite Services provides two-way data transmission between hub (entry point into EDS*NET) and multiple remote locations. Video reception is provided as an option at the remote locations.

VSAT networks are designed for a minimum of 99.5 percent overall availability. Higher or lower availabilities can be custom designed for each network.

- VSAT systems--remotes--are designed for two (2) years between failures
- Hubs are fully redundant, designed for 100 percent uninterrupted operation Response time is typically three and one-half (3.5) to five (5) seconds on an average for peak busy hour, however, higher or lower (not less than one (1) second) response times can be designed individually for each VSAT.

Maintenance will be coordinated with the Account on an as required basis.

Terms Applicable to Product:

Minimum Term - Sixty (60) month fixed pricing.

Termination Prior to Minimum Term: TS will make a good faith effort to reallocate or dispose of the assets which have not been amortized at the time of termination. The Account must continue to pay for non recoverable expenses until the disposal costs h Service Level Agreement

42

Price Quote:

Attachment A contains the price quote for the requested products. The quote is valid for sixty (60) days. Changes to your stated requirements will alter these prices. The final pricing will depend on the installed configuration that you request.

Overtime expenses, due to the Account's actions or requests, may result in additional implementation charges.

Account Requirements:

The Account needs to ensure adequate access to facilities to complete installation and maintain the service. The Account agrees to be responsible for damages due to unauthorized maintenance, abuse or loss of the products.

If there is a change in an existing circuit configuration, the current circuits should remain in place for at least two (2) weeks to provide backup. It is the Account's responsibility to initiate circuit disconnect orders.

Billing Information:

Recurring and non-recurring charges will appear on the Statement of Communication Services (SOCS).

The billing for service will be made to the following MOC and Responsibility Center:

MOC: xxx RC: xxxx.xxx CCI Number: New-

Contacts:

CRS Originator xxxxxxxxx (xxx) xxx-xxxx (8-xxx)

Account Technical Contact xxxxxxxxx (xxx) xxx-xxxx (8-xxx)

Approval:

Your electronic response to this agreement indicates approval of the terms and conditions of the service(s) provided by TS. Please respond by stating that you have reviewed this agreement and approve the contents. Via officeVision, "forward" or if using We look forward to serving you in meeting your requirements.

************************************************

The following price quote was prepared by Business Costing and Pricing. If you have any questions regarding the contents of this attachment, please call

09/075,466

Appendix J

©1998 Electronic Data Systems Corporation

VSATpricing98c.xls

43

PRODUCT LINE: EDS*SAT - Satellite Services
PROJECT #: IRS ??? - INFORMAL PRICE QUOTE
PROJECT NAME:

| | PRODUCT | QTY | NRC PER UNIT PRICE | MONTHLY UNIT PRICE | TOTAL MONTHLY | TOTAL NON-REC CHARGES | Users | 5yr Shared | 5yr Private | 3yr Shared | 3yr Private |
|---|---|---|---|---|---|---|---|---|---|---|---|
| | SATELLITE SERVICES | | | | | | | | | | |
| | 50% Utilization | | | | | | | | | | |
| | 60 MONTHS. SHARED HUB @ DAYTON | | | | | | | | | | |
| 1 | USERS | 0 | 0 | 0 | $0 | $0 | 0 | 0 | 0 | 0 | 0 |
| 2 | | 0 | 0 | 0 | $0 | $0 | 0 | 0 | 0 | 0 | 0 |
| 3 | | 0 | 0 | 0 | $0 | $0 | 0 | 0 | 0 | 0 | 0 |
| 4 | | 0 | 0 | 0 | $0 | $0 | 0 | 0 | 0 | 0 | 0 |
| | 36 MONTHS. SHARED HUB @ DAYTON | | | | | | | | | | |
| 1 | USERS | 0 | 0 | 0 | $0 | $0 | | | | | |
| 2 | | 0 | 0 | 0 | $0 | $0 | | | | | |
| 3 | | 0 | 0 | 0 | $0 | $0 | | | | | |
| 4 | | 0 | 0 | 0 | $0 | $0 | | | | | |
| | 60 MONTHS. PRIVATE HUB @ DAYTON | | | | | | | | | | |
| 1 | USERS | 0 | 0 | 0 | $0 | $0 | | | | | |
| 2 | | 0 | 0 | 0 | $0 | $0 | | | | | |
| 3 | | 0 | 0 | 0 | $0 | $0 | | | | | |
| 4 | | 0 | 0 | 0 | $0 | $0 | | | | | |
| | 36 MONTHS. PRIVATE HUB @ DAYTON | | | | | | | | | | |
| 1 | USERS | 0 | 0 | 0 | $0 | $0 | | | | | |
| 2 | | 0 | 0 | 0 | $0 | $0 | | | | | |
| 3 | | 0 | 0 | 0 | $0 | $0 | | | | | |
| 4 | | 0 | 0 | 0 | $0 | $0 | | | | | |
| | 60% Utilization | | | | | | | | | | |
| | 60 MONTHS. SHARED HUB @ DAYTON | | | | | | | | | | |
| 1 | USERS | 0 | 0 | 0 | $0 | $0 | 0 | 0 | 0 | 0 | 0 |
| 2 | | 0 | 0 | 0 | $0 | $0 | 0 | 0 | 0 | 0 | 0 |
| 3 | | 0 | 0 | 0 | $0 | $0 | 0 | 0 | 0 | 0 | 0 |
| 4 | | 0 | 0 | 0 | $0 | $0 | 0 | 0 | 0 | 0 | 0 |
| | 36 MONTHS. SHARED HUB @ DAYTON | | | | | | | | | | |
| 1 | USERS | 0 | 0 | 0 | $0 | $0 | | | | | |
| 2 | | 0 | 0 | 0 | $0 | $0 | | | | | |
| 3 | | 0 | 0 | 0 | $0 | $0 | | | | | |
| 4 | | 0 | 0 | 0 | $0 | $0 | | | | | |
| | 60 MONTHS. PRIVATE HUB @ DAYTON | | | | | | | | | | |
| 1 | USERS | 0 | 0 | 0 | $0 | $0 | | | | | |
| 2 | | 0 | 0 | 0 | $0 | $0 | | | | | |
| 3 | | 0 | 0 | 0 | $0 | $0 | | | | | |
| 4 | | 0 | 0 | 0 | $0 | $0 | | | | | |
| | 36 MONTHS. PRIVATE HUB @ DAYTON | | | | | | | | | | |
| 1 | USERS | 0 | 0 | 0 | $0 | $0 | | | | | |
| 2 | | 0 | 0 | 0 | $0 | $0 | | | | | |
| 3 | | 0 | 0 | 0 | $0 | $0 | | | | | |
| 4 | | 0 | 0 | 0 | $0 | $0 | | | | | |

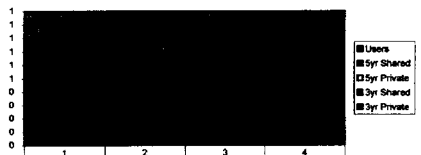

| | 1 | 2 | 3 | 4 |
|---|---|---|---|---|
| Users | 0 | 0 | 0 | 0 |
| 5yr Shared | 0 | 0 | 0 | 0 |
| 5yr Private | 0 | 0 | 0 | 0 |
| 3yr Shared | 0 | 0 | 0 | 0 |
| 3yr Private | 0 | 0 | 0 | 0 |

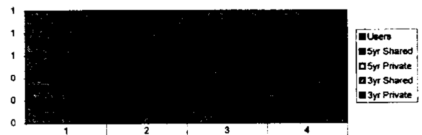

| | 1 | 2 | 3 | 4 |
|---|---|---|---|---|
| Users | 0 | 0 | 0 | 0 |
| 5yr Shared | 0 | 0 | 0 | 0 |
| 5yr Private | 0 | 0 | 0 | 0 |
| 3yr Shared | 0 | 0 | 0 | 0 |
| 3yr Private | 0 | 0 | 0 | 0 |

COMMENTS:

GENERAL

- o THIS QUOTE REPRESENTS WHOLESALE RATES AND DOES NOT INCLUDE ACCOUNT MARGIN
- o THIS QUOTE PROVIDES INSTALLED, COMMISSIONED AND CUTOVER OF COMMUNICATIONS SERVICES FOR REMOTE PES 5000 VSATS TO A SHARED VSAT HUB STATION IN AUBURN HILLS, MI OR PRIVATE HUB IN CHARLOTTE, NC AS SPECIFIED THE FOLLOWING INFORMATION AND ASSUMPTIONS ARE BASED ON ACCOUNT PROVIDED INFORMATION AND OUR EXPERIENCE IN THE INDUSTRY. THIS QUOTE IS LIMITED TO THE SPECIFIC CRITERIA DESCRIBED AND DOES NOT NECESSARY MEET ALL POSSIBLE IMPLEMENTATION SCENARIOS.
- o THIS COSTING PROVIDES THE MONTHLY AND ONE-TIME COSTS TO THE ACCOUNT FOR THE PRODUCTS AND SERVICES REQUESTED
- o THE TERM OF THIS AGREEMENT IS THREE (3) YEARS OR FIVE (5) YEARS AS SPECIFIED

VSATpricing98c.xls

44 o COSTING DOES NOT INCLUDE TERRESTRIAL CIRCUITS, MODEMS, CSUs, MULTIPLEXERS, ROUTERS, FRONT END PORTS OR LOGICAL UNITS.

o ANY CHANGE IN DESIGN OR REQUIREMENTS MAY REQUIRE A REVISION OF THIS QUOTE.

HUB AND VSAT SERVICES o THIS AGREEMENT PROVIDES SATELLITE COMMUNICATIONS BETWEEN CONUS LOCATIONS AND A SHARED HUB AS SPECIFIED. ANTENNA SIZING IS DESIGNED FOR 1.0 OR 1.2M ANTENNAS AS SPECIFIED BY LOCATION. ACTIVE DEICING IS NOT INCLUDED AT THIS TIME.

o EACH 1.0/1.2M VSAT INCLUDES AN ANTENNA, RF HEAD, INDOOR UNIT, ETHERNET AND 2 SERIAL PORT INTERFACES. ALL INDOOR UNITS (IDUs) ARE EQUIPPED WITH A STANDARD COAXIAL CONNECTOR FOR USE WITH DIGITAL VIDEO/AUDIO APPLICATIONS. THIS SERVICE DOES NOT INCLUDE VIDEO EQUIPMENT OR SERVICES.

o THE STANDARD TURNKEY VSAT INSTALLATION INCLUDES A BALLAST MOUNT, 125' OF PVC IFL CABLE, SITE SURVEY (AS DETERMINED BY THE VENDOR) AND PERMITTING, COMMISSIONING AND SAME DAY CUTOVER.

o EXAMPLES OF NONSTANDARD INSTALLATION ITEMS INCLUDE BUT ARE NOT LIMITED TO THE FOLLOWING: WALL, GROUND OR PENETRATING ROOF MOUNTS, A CRANE TO LIFT THE REFLECTOR, LANDSCAPING, FENCING, >125 FEET OF PVC IFL CABLE OR TEFLON/PLENUM IFL CABLE REQUIREMENTS.

o VSAT MAINTENANCE IS 8AM TO 5PM LOCAL RESPONSE AND PROVIDE A STANDARD 4 HOUR RESPONSE TIME IN MOST AREAS o NETWORK TRAFFIC EVALUATION:

*Assumes that if 200 users equals 20% utilization of a T1 due to logical FRAD limitations then 500 users per T1 equals 50% utilization T1. Data distribution is 70% outbound & 30% inbound.

| Users | OUTBOUND | INBOUND | OUTROUTES | INROUTES | SLIMS REQ'D |
|---|---|---|---|---|---|
| 0 | 0 | 100 | | | |
| 0 | 0 | 0 | 0.00 | 0.00 | 0.00 |
| 0 | 0 | 0 | 0.00 | 0.00 | 0.00 |
| 0 | 0 | 0 | 0.00 | 0.00 | 0.00 |
| 0 | 0 | 0 | 0.00 | 0.00 | 0.00 |

| | 36 mos | | |
|---|---|---|---|
| | Users | Private | Shared |
| 1 | 0 | 0 | 0 |
| 2 | 0 | 0 | 0 |
| 3 | 0 | 0 | 0 |
| 4 | 0 | 0 | 0 |

| | 60 mos | | |
|---|---|---|---|
| | Users | Private | Shared |
| 1 | 0 | 0 | 0 |
| 2 | 0 | 0 | 0 |
| 3 | 0 | 0 | 0 |
| 4 | 0 | 0 | 0 |

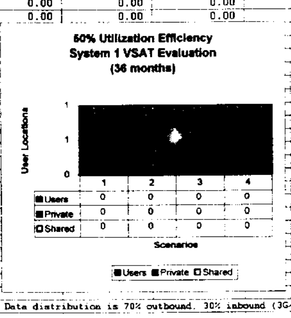

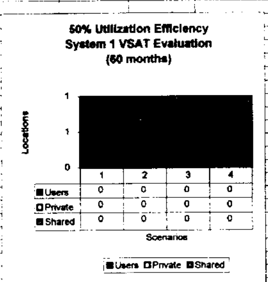

*600 users per T1 @ 60% utilization T1. Data distribution is 70% outbound, 30% inbound (3G/10M byte) in differing timeframes.

| Users | OUTBOUND | INBOUND | OUTROUTES | INROUTES | SLIMS REQ'D |
|---|---|---|---|---|---|
| 0 | 0 | 0 | | | |
| 0 | 0 | 0 | 0.00 | 0.00 | 0.00 |
| 0 | 0 | 0 | 0.00 | 0.00 | 0.00 |
| 0 | 0 | 0 | 0.00 | 0.00 | 0.00 |
| 0 | 0 | 0 | 0.00 | 0.00 | 0.00 |

| | 36 mos | | |
|---|---|---|---|
| | Users | Private | Shared |
| 1 | 0 | 0 | 0 |
| 2 | 0 | 0 | 0 |
| 3 | 0 | 0 | 0 |
| 4 | 0 | 0 | 0 |

| | 60 mos | | |
|---|---|---|---|
| | Users | Private | Shared |
| 1 | 0 | 0 | 0 |
| 2 | 0 | 0 | 0 |
| 3 | 0 | 0 | 0 |
| 4 | 0 | 0 | 0 |

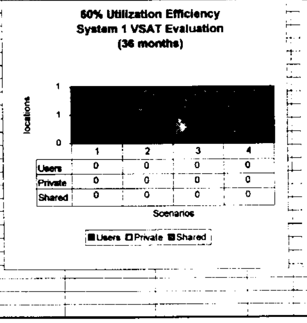

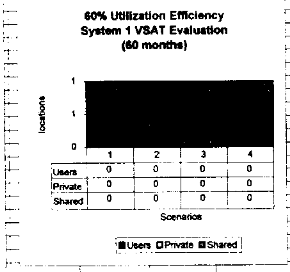

VSATpricing98c.xls

45

| | |
|---|---|
| o | NETWORK TRAFFIC THROUGHPUT IS BASED ON 400Kbps FOR OUTROUTE, 50% UTILIZATION OF 100Kbps FOR INROUTES AND 50% |
| | UTILIZATION OF 400Kbps FOR SLIMS X2 FOR REDUNDANCY. NETWORK SIMULATION HAS NOT BEEN USED AT THIS TIME. |
| | |
| o | BACKHUAL FACILITIES, ALTHOUGH NOT INCLUDED IN THIS QUOTE, APPEAR TO REQUIRE A FRACTIONAL T1 @ 128Kbps OR 2 56Kbps |
| | CIRCUITS. |
| | |
| o | SHARED HUB SERVICES INCLUDE SHARED RESOURCES, DEDICATED BASEBAND EQUIPMENT AND SHARED/DEDICATED RECURRING EXPENSES. |
| | RF AND BASEBAND REDUNDANCY IS INCLUDED; FIELD SERVICES AND NETWORK OPERATIONS WILL BE PROVIDED ON A 24 HR BASIS OR |
| | AS SPECIFIED. |
| | |
| o | COSTING INCLUDES VENDOR CONTRACT MANAGEMENT, ENGINEERING, OPERATIONS, PRODUCT LINE, BILLING, IMPLEMENTATION AND |
| | ASSET MANAGEMENT SUPPORT SERVICES FOR THE VSAT TO HUB NETWORK ONLY. |

What is claimed is:

1. An automated method of pricing a satellite network, using a computer programmed with electronic spreadsheet software, comprising the steps of:

receiving sizing input data into a traffic sizing spreadsheet, said sizing input data representing the quantity of communications traffic on said network;

using said traffic sizing spreadsheet to calculate sizing output data for said network;

receiving cost input data into a unit costing spreadsheet, said cost input data representing the cost for each of a number of units of equipment and service associated with said network;

receiving network input data into an input spreadsheet, said network input data comprising equipment unit data, hub service data, hub equipment data, and space segment data, wherein said equipment unit data represents a desired number of units of equipment for said network, and wherein said hub service data represents characteristics of hub service for said network, and wherein hub equipment data and said space segment data are obtained at least in part from said sizing output data;

using said unit costing spreadsheet to calculate total costs per unit of said network;

using a technical infrastructure spreadsheet to calculate financial data from data retrieved from other of said spreadsheets; and using a quote document spreadsheet to calculate customer quote data from data retrieved from other of said spreadsheets.

2. The method of claim 1, further comprising the step of using at least one of said spreadsheets to automatically retrieve satellite space segment values from a space segment spreadsheet in response to said sizing output data.

3. The method of claim 1, wherein said network is a shared network, and further comprising the step of using at least one of said worksheets to automatically calculate a shared hub usage value.

4. The method of claim 1, further comprising the step of using at least one of said spreadsheets to receive geographic data for said network and to retrieve tax rate data from a taxrate spreadsheet in response to geographic data.

5. The method of claim 1, further comprising the step of using a competitive analysis spreadsheet to receive cost data for said network from other of said spreadsheets, to receive cost data for a competing network, and to automatically calculate variance values.

6. The method of claim 1, further comprising the step of using at least one of said spreadsheets to receive margin data, and wherein said financial data comprises net data, and further comprising the step of using at least one of said spreadsheets to display said net data such that said margin data can be iteratively adjusted.

7. The method of claim 1, wherein said sizing output data represents at least a required number of inroutes and outroutes.

8. The method of claim 1, wherein said sizing output data represents at least a required number of interface modules.

9. The method of claim 1, wherein said sizing input data represents at least inroute and outroute throughput rates.

10. The method of claim 1, wherein said traffic sizing spreadsheet provides both preliminary sizing output data and advanced sizing output data.

11. A computer implemented network pricing system, comprising:

a computer system having a processor and memory, the computer system executing an electronic spreadsheet software application that provides said network pricing system;

said electronic spreadsheet software operable to provide the following spreadsheets: a traffic sizing spreadsheet that receives sizing input data, said sizing input data representing the quantity of communications traffic on said network, and the calculates sizing output data for said network; a unit costing spreadsheet that receives cost input data, said cost input data representing the cost for each of a number of units of equipment and service associated with said network, and that calculates total costs per unit of said network; an input spreadsheet that receives network input data, said network input data comprising equipment unit data, hub service data, hub equipment data, and space segment data, wherein said equipment unit data represents a desired number of units of equipment for said network, and wherein said hub service data represents characteristics of hub service for said network, and wherein hub equipment data and said space segment data are obtained from said sizing output data; a technical infrastructure spreadsheet that calculates financial data from data retrieved from other of said spreadsheets; and a quote document spreadsheet that calculates customer quote data from data retrieved from other of said spreadsheets.

12. The system of claim 11, wherein said software further provides a space segment spreadsheet, and wherein at least one of said worksheets retrieves satellite space segment values from said space segment spreadsheet in response to said sizing output data.

13. The system of claim 11, wherein said network is a shared network and wherein at least one of said worksheets automatically calculates a shared hub usage value.

14. The system of claim 11, wherein said software further provides a taxrate spreadsheet, wherein said input spreadsheet receives geographic data for said network, and wherein at least one of said worksheets retrieves tax rate data from said taxrate spreadsheet in response to geographic data.

15. The system of claim 11, wherein said software further provides a competitive analysis spreadsheet that retrieves cost data from said unit cost spreadsheet, receives cost data for a competing network, and calculates variance values.

16. The system of claim 11, wherein at least one of said spreadsheets also receives margin data, and said financial data comprises net data, and wherein at least one of said spreadsheets retrieves said net data such that said margin data can be iteratively adjusted.

17. The system of claim 11, wherein said traffic sizing spreadsheet provides both preliminary sizing output data and advanced sizing output data.

* * * * *